(12) United States Patent
Wada et al.

(10) Patent No.: US 11,776,419 B2
(45) Date of Patent: Oct. 3, 2023

(54) SKILL EVALUATION DEVICE, SKILL EVALUATION METHOD, AND STORAGE MEDIUM

(71) Applicant: OMRON Corporation, Kyoto (JP)

(72) Inventors: Hirotaka Wada, Kyoto (JP); Hiroshi Nakajima, Kyoto (JP); Danni Wang, Kyoto (JP)

(73) Assignee: OMRON Corporation, Kyoto (JP)

( * ) Notice: Subject to any disclaimer, the term of this patent is extended or adjusted under 35 U.S.C. 154(b) by 45 days.

(21) Appl. No.: 17/013,834

(22) Filed: Sep. 7, 2020

(65) Prior Publication Data
US 2021/0125518 A1  Apr. 29, 2021

(30) Foreign Application Priority Data

Oct. 29, 2019  (JP) .................................. 2019-196465

(51) Int. Cl.
| | |
|---|---|
| G09B 19/00 | (2006.01) |
| G06Q 10/0639 | (2023.01) |
| G06F 3/0484 | (2022.01) |

(52) U.S. Cl.
CPC ....... G09B 19/00 (2013.01); G06Q 10/06398 (2013.01); G06F 3/0484 (2013.01)

(58) Field of Classification Search
CPC ......... G06Q 10/0639; G06Q 10/06393; G06Q 10/06398; G09B 19/003; G09B 19/24
See application file for complete search history.

(56) References Cited

U.S. PATENT DOCUMENTS

| | | | | |
|---|---|---|---|---|
| 8,306,731 B2 * | 11/2012 | Waggaman, III | ...... | G06Q 10/06 701/408 |
| 2005/0216326 A1 * | 9/2005 | Inoue | ..................... | G06Q 10/10 702/187 |

(Continued)

FOREIGN PATENT DOCUMENTS

| | | | | | |
|---|---|---|---|---|---|
| JP | H0855103 A | * | 2/1996 | ............. | G06F 17/00 |
| JP | 2004086322 | | 3/2004 | | |

(Continued)

OTHER PUBLICATIONS

"Notice of Reasons for Refusal of Japan Counterpart Application", dated Jul. 18, 2023, with English translation thereof, p. 1-p. 7.

*Primary Examiner* — Robert J Utama
*Assistant Examiner* — Correll T French
(74) *Attorney, Agent, or Firm* — JCIPRNET

(57) ABSTRACT

The disclosure provides a skill evaluation device, a skill evaluation method, and a storage medium capable of appropriately evaluating the skill of an operator by changing a time range for evaluating the skill of the operator. The skill evaluation device includes an acquisition part, an extraction part, a calculation part, and an output part. The acquisition part acquires time range information indicating an arbitrary time range. The extraction part extracts data of a specific time range determined based on the time range information from operation status data indicating an operation status of the operator in a time series. The calculation part calculates an index value of the skill of the operator for one or more evaluation items based on the data of the specific time range. The output part outputs index information indicating the index value.

8 Claims, 16 Drawing Sheets

(56) References Cited

U.S. PATENT DOCUMENTS

| | | | |
|---|---|---|---|
| 2007/0192157 A1* | 8/2007 | Gooch | G06Q 10/10 705/7.41 |
| 2008/0071609 A1* | 3/2008 | Yanase | G06Q 10/06398 705/7.42 |
| 2011/0022432 A1* | 1/2011 | Ishida | G06Q 10/06398 705/7.42 |
| 2011/0276162 A1* | 11/2011 | Nonaka | G06Q 10/109 700/100 |
| 2015/0269512 A1* | 9/2015 | Wartel | G06Q 10/06393 705/7.39 |
| 2016/0171633 A1* | 6/2016 | DeWalt | G06Q 10/06398 705/7.15 |

FOREIGN PATENT DOCUMENTS

| | | |
|---|---|---|
| JP | 2005165371 | 6/2005 |
| JP | 2006106154 | 4/2006 |
| JP | 2006171184 | 6/2006 |
| JP | 6082101 | 2/2017 |
| JP | 2018049480 | 3/2018 |
| JP | 2018142058 | 9/2018 |
| JP | 2019102995 | 6/2019 |

\* cited by examiner

Operation status data of left hand

| Start time | End time | Operation status |
|---|---|---|
| 00:00.00 | 00:10.00 | Holding |
| 00:10.00 | 00:13.00 | Transporting |
| 00:13.00 | 00:15.00 | Adjusting |
| 00:15.00 | 00:18.00 | N/A |
| 00:18.00 | 00:22.00 | Adjusting |
| 00:22.00 | 00:26.00 | N/A |
| ... | ... | ... |

Operation status data of right hand

| Start time | End time | Operation status |
|---|---|---|
| 00:00.00 | 00:12.00 | Holding |
| 00:12.00 | 00:13.00 | Transporting |
| 00:13.00 | 00:15.00 | Adjusting |
| 00:15.00 | 00:16.00 | Holding |
| 00:16.00 | 00:18.00 | Transporting |
| 00:18.00 | 00:22.00 | Adjusting |
| 00:22.00 | 00:24.00 | Holding |
| 00:24.00 | 00:24.30 | N/A |
| 00:24.30 | 00:26.00 | Transporting |
| ... | ... | ... |

FIG. 2

| Component (procedure) | Reference time | Component (execution) | Execution time |
|---|---|---|---|
| 1 | 0.4 | 1 | 0.3 |
| 2 | 0.3 | 2 | 0.2 |
| 3 | 0.4 | 4 | 0.5 |
| 4 | 0.5 | 3 | 0.3 |
| 5 | 0.4 | 5 | 0.3 |
| 6 | 0.5 | 6 | 0.4 |
| 7 | 0.3 | 7 | 0.3 |

FIG. 15

SKILL EVALUATION DEVICE, SKILL EVALUATION METHOD, AND STORAGE MEDIUM

CROSS-REFERENCE TO RELATED APPLICATION

This application claims the priority benefit of Japan application serial no. 2019-196465, filed on Oct. 29, 2019. The entirety of the above-mentioned patent application is hereby incorporated by reference herein and made a part of this specification.

BACKGROUND

Technical Field

The disclosure relates to a skill evaluation device, a skill evaluation method, and a storage medium.

Description of Related Art

Conventionally, methods are provided to evaluate the motion, reaction, or the like of a subject. For example, Patent literature 1 describes a body motion scoring device which evaluates a body motion such as a sense of rhythm of a subject based on a result of comparison between the position of each part of the subject's body and a predetermined condition at a predetermined timing.

In addition, Patent literature 2 describes an evaluation system which analyzes a video of a subject who participates in a class, a meeting, or the like, extracts non-verbal information such as motion and facial expression of the subject, and evaluates the reaction of the subject based on the extracted non-verbal information.

LITERATURE OF PRIOR ART

Patent Literature

Patent literature 1: Japanese Patent Publication No. 6082101
Patent literature 2: Japanese Patent Application Laid-Open No. 2018-49480

SUMMARY

Problems to be Solved

In Patent literatures 1 and 2, the subject of evaluation is a person doing dance or karaoke, or a participant in a class, a meeting, or the like. Therefore, the entire time that is subjected to the evaluation is a relatively short time.

However, in a factory or the like, an operator who manufactures a product by combining one or more components repeatedly performs predetermined operations (e.g., at least one of holding a component, adjusting a component, transporting a component, and storing a component) over a long time. Therefore, for example, there is a possibility that the skill of the operator cannot be appropriately evaluated simply based on an index for the entirety of a relatively long operating time such as one day.

Therefore, the disclosure provides a skill evaluation device, a skill evaluation method, and a storage medium capable of appropriately evaluating the skill of an operator by changing the time range for evaluating the skill of the operator.

Means to Solve Problems

According to one aspect of the disclosure, a skill evaluation device includes an acquisition part, an extraction part, a calculation part, and an output part. The acquisition part acquires time range information indicating an arbitrary time range. The extraction part extracts data of a specific time range determined based on the time range information from operation status data indicating an operation status of an operator in a time series. The calculation part calculates an index value of a skill of the operator for one or more evaluation items based on the data of the specific time range. The output part outputs index information indicating the index value.

According to this aspect, since the time range for evaluating the skill of the operator can be changed based on the time range information, it is possible to appropriately evaluate the skill of the operator.

In the above aspect, the acquisition part may acquire evaluation unit information indicating an evaluation unit of the skill of the operator, and the extraction part may determine the data of the specific time range which at least partially overlaps with the arbitrary time range indicated by the time range information based on the evaluation unit information.

According to this aspect, since the data of the arbitrary time range indicated by the time range information can adjust based on the evaluation unit information to determine the data of the specific time range used for calculating the index value, it is possible to improve the evaluation accuracy of the skill of the operator.

In the above aspect, the extraction part may determine, as the data of the specific time range, data within the arbitrary time range indicated by the time range information excluding data unassociated with the evaluation unit.

According to this aspect, data that are included within the arbitrary time range indicated by the time range information but are unassociated with the evaluation unit can be excluded from the data of the specific time range used for calculating the index value. Therefore, even if the arbitrary time range does not completely match the time range associated with the evaluation unit, the index value can still be calculated based on the data of the time range associated with the evaluation unit, and the evaluation accuracy of the skill in the evaluation unit can be improved.

In the above aspect, the extraction part may determine, as the data of the specific time range, data associated with the evaluation unit within a predetermined period adjacent to the arbitrary time range indicated by the time range information.

According to this aspect, the data associated with the evaluation unit can be included in the data of the specific time range used calculating the index value even if they are outside the arbitrary time range indicated by the time range information. Therefore, even if the arbitrary time range does not completely match the time range associated with the evaluation unit, the index value can still be calculated based on the data of time range associated with the evaluation unit, and the evaluation accuracy of the skill in the evaluation unit can be improved.

In the above aspect, the extraction part may determine, as the data of the specific time range, data associated with the evaluation unit within the arbitrary time range indicated by the time range information.

According to this aspect, the data that are associated with the evaluation unit and are included in the arbitrary time range indicated by the time range information can be included in the data of the specific time range used for calculating the index value. Therefore, the skill evaluation can be performed in the desired evaluation unit within the arbitrary time range.

In the above aspect, a display part displaying the operation status data may be further provided, and the acquisition part may acquire the time range information inputted from an input part based on the operation status data displayed on the display part.

According to this aspect, since the user can specify the arbitrary time range (e.g., the time range in which the operator operates abnormally) from the operation status data displayed on the display part, the skill evaluation of the operator can be performed more flexibly.

In the above aspect, the display part may display the operation status data for each of a right hand and a left hand of the operator. According to this aspect, the user can specify the arbitrary time range more appropriately.

According to another aspect of the disclosure, a skill evaluation method includes the following steps. Time range information indicating an arbitrary time range is acquired. Data of a specific time range determined based on the time range information are extracted from operation status data indicating an operation status of an operator in a time series. An index value of a skill of the operator is calculated for one or more evaluation items based on the data of the specific time range. Index information indicating the index value is outputted.

According to this aspect, since the time range for evaluating the skill of the operator can be changed based on the time range information, it is possible to appropriately evaluate the skill of the operator.

According to another aspect of the disclosure, a non-transitory computer readable storage medium, storing a skill evaluation program causes a computation part provided in a skill evaluation device to function as follows. An acquisition part acquires time range information indicating an arbitrary time range. An extraction part extracts data of a specific time range determined based on the time range information from operation status data indicating an operation status of an operator in a time series. A calculation part calculates an index value of a skill of the operator for one or more evaluation items based on the data of the specific time range. An output part outputs index information indicating the index value.

According to this aspect, since the time range for evaluating the skill of the operator can be changed based on the time range information, it is possible to appropriately evaluate the skill of the operator.

Effect

According to the disclosure, it is possible to provide a skill evaluation device, a skill evaluation method, and a storage medium capable of appropriately evaluating the skill of an operator by changing the time range for evaluating the skill of the operator.

BRIEF DESCRIPTION OF THE DRAWINGS

FIG. 2 is a view showing an example of operation status data according to the present embodiment.

FIG. 15 is a view showing an example of calculating an index of a second evaluation item according to the present embodiment.

DESCRIPTION OF THE EMBODIMENTS

Figure 1:
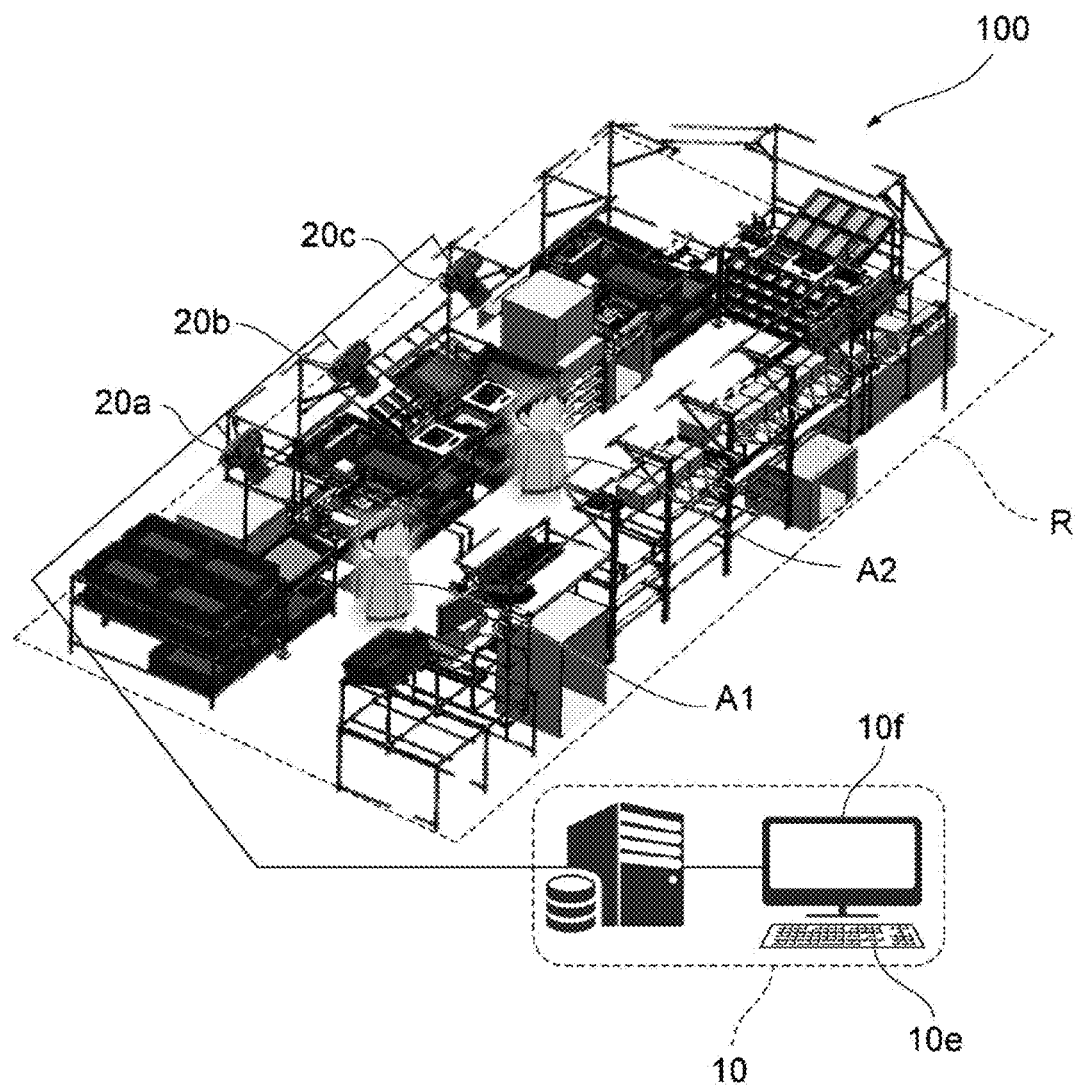
FIG. 1 is a view schematically showing a skill evaluation system according to an embodiment of the disclosure.

Embodiments of the disclosure will be described with reference to the accompanying drawings. In addition, in each of the drawings, those labeled with the same reference numerals have the same or similar configurations.

§ 1 Application Example

First, an example of a scene to which the disclosure is applied will be described with reference to FIG. 1. A skill evaluation system 100 according to the present embodiment includes a first image capturing part 20a, a second image capturing part 20b, and a third image capturing part 20c for capturing a moving image showing an operation of an operator executed in a certain operation area R. In this example, the operation area R is an area including an entire manufacturing line, but the operation area R may be any area, for example, an area in which a predetermined process for producing a product or a component is performed. Hereinafter, the first image capturing part 20a, the second image capturing part 20b, and the third image capturing part 20c will be collectively referred to as an image capturing part 20.

In this example, a case where a first operator A1 and a second operator A2 perform a predetermined operation in the operation area R will be described. For example, the first operator A1 may be a skilled person whose years of experience and the like satisfy a predetermined criterion, and the second operator A2 may be a beginner who does not satisfy the predetermined criterion.

In addition, while the first operator A1 and the second operator A2 are assumed to perform a same process in this example, they may also perform different processes. For example, the first operator A1 and the second operator A2 may each perform an operation associated with a same product (e.g., products 1 and 2). Alternatively, the first operator A1 may perform an operation associated with a product (e.g., the product 1), and the second operator A2 may perform an operation associated with another product (e.g., the product 2). Hereinafter, the first operator A1 and the second operator A2 will be collectively referred to as an operator A.

The skill evaluation system 100 includes a skill evaluation device 10. The skill evaluation device 10 stores operation status data indicating the operation status of the operator A in a time series. Herein, the operation status data may be a set of data indicating the operation status of the operator A in a time series. The operation status data may be stored for each predetermined part (e.g., right hand, left hand, etc.).

FIG. 2 is a view showing an example of the operation status data according to the present embodiment. As shown in FIG. 2, the operation status data may be composed of one or more data that associates a predetermined operation status with a start timing and an end timing of the predetermined operation status. For example, FIG. 2 shows the operation status data of each of the right hand and the left hand of the operator A, but the disclosure is not limited thereto. Each data forming the operation status data may also be referred to as a record or the like.

Herein, the predetermined operation status is one or more operation statuses (also referred to as element operations) that are manufacturing points of a product or a component, and may include, for example, at least one of "holding", "adjusting", "transporting", "storing", "inspecting", "stop", "N/A (non-operating status)", and the like. The series of motions captured by the image capturing part 20 may be classified into the one or more operation statuses.

Further, the start timing of the predetermined operation status may be at least one of a start date, a start date/time, a start time, etc. of the predetermined operation status, for example. Similarly, the end timing of the predetermined operation status may be at least one of an end date, an end date/time, an end time, etc. of the predetermined operation status, for example. For example, in FIG. 2, the start time and the end time are shown as the start timing and the end timing of the predetermined operation status, but the disclosure is not limited thereto.

The operation status data shown in FIG. 2 are merely an example, and any data indicating the operation status of the operator A in a time series may be used. For example, either of the start timing and the end timing may be associated with the predetermined operation status. In addition, the operation status data may indicate the operation status of parts other than the right hand and the left hand in a time series, or may indicate the overall operation status of the operator in a time series without distinguishing the right hand and the left hand.

The skill evaluation device 10 may store the above operation status data in advance, or may generate the operation status data based on arbitrary data. The arbitrary data may be a moving image showing the operation of the operator A captured by the image capturing part 20, or may be a coordinate value obtained by analyzing the moving image. Alternatively, the arbitrary data may be a coordinate value indicating the operation of the operator A measured through motion capture, or may be data indicating the motion of the operator A measured by mounting the operator A with an acceleration sensor or a gyro sensor.

Figure 3:
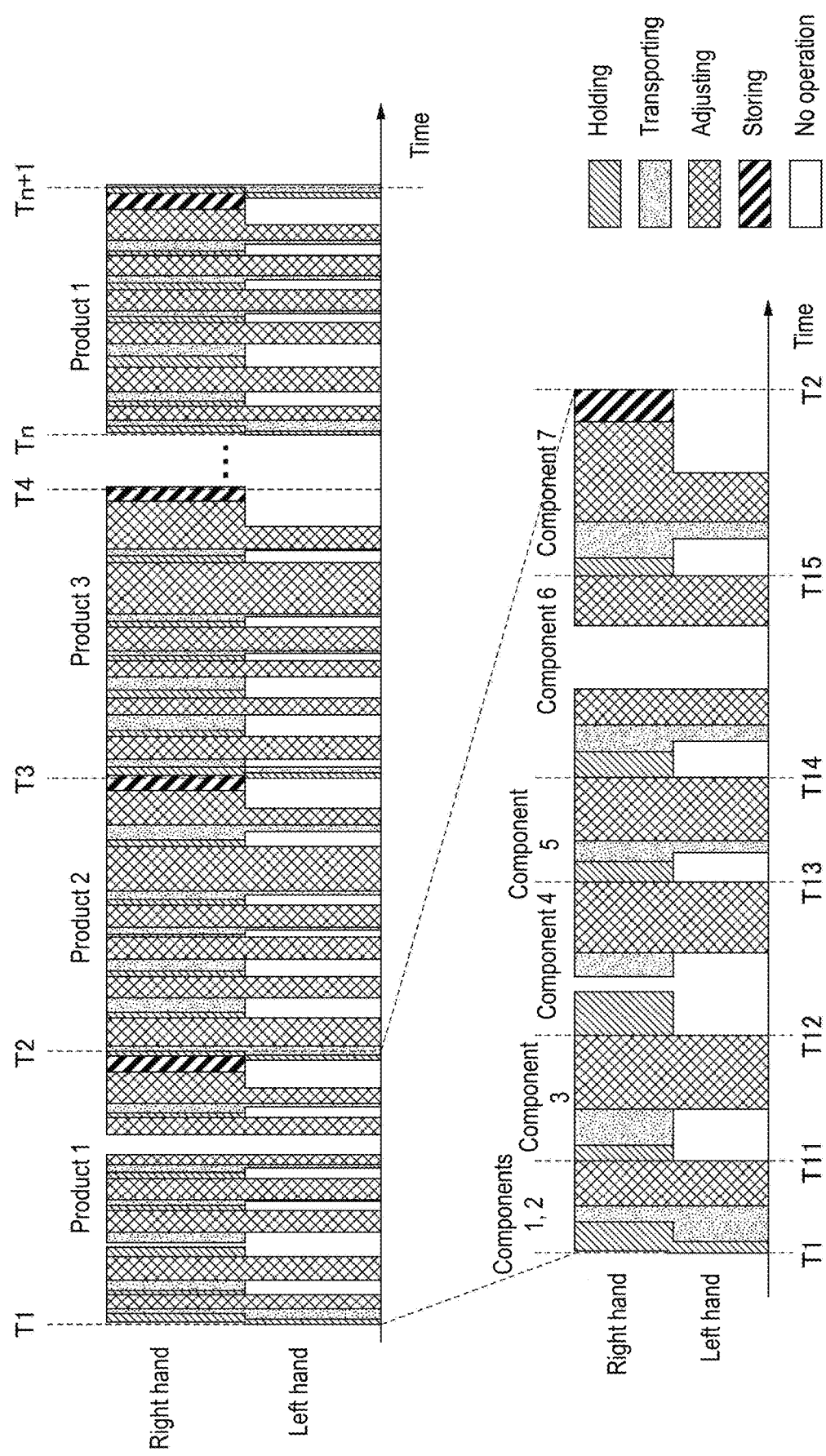
FIG. 3 is a view showing an example of display of the operation status data according to the present embodiment.

A display part 10f of the skill evaluation device 10 may display the above operation status data on a time axis. FIG. 3 is a view showing an example of display of the operation status data according to the present embodiment. As shown in FIG. 3, the display part 10f may display the operation status of each predetermined part on a time axis in a distinguishable manner. For example, in FIG. 3, "holding", "adjusting", "transporting", "storing", and "no operation" are shown in different hatchings, but the disclosure is not limited thereto. The different operation statuses may also be displayed in a distinguishable manner in different colors or the like.

As shown in FIG. 3, the time range associated with each product may include one or more operation statuses. For example, in FIG. 3, a time range T1-T2 associated with the product 1 includes a plurality of operation statuses such as holding, adjusting, transporting, and storing. Also, the time range associated with each product may include time ranges associated with one or more components. For example, in FIG. 3, the time range T1-T2 associated with the product 1 includes time ranges associated with components 1 to 7. Also, the time range associated with each component may include one or more operation statuses. For example, a time range T11-T12 associated with the component 3 includes holding, transporting, and adjusting.

In FIG. 3, while the display part 10f displays, together with the operation status data, identification information (e.g., the products 1 to 3 and the components 1 to 7 in FIG. 3) indicating to which product or component each operation status belongs in the time range, it is also possible that the identification information is not displayed.

Further, in FIG. 3, while the display part 10f displays the switching timing between the products (e.g., timings T1 to T4, Tn, and Tn+1 in FIG. 3) and the switching timing between the components (e.g., timings T11 to T15 in FIG. 3) together with the operation status data, it is also possible that the timing is not explicitly displayed. Herein, the switching timing between the products may be the end timing of the operation associated with the previous product or the start timing of the operation associated with the next product. The switching timing between the components may be the end timing of the operation associated with the previous component or the start timing of the operation associated with the next component.

In the skill evaluation device 10 of FIG. 1, not only is an index of the skill of the operator A calculated for one or more evaluation items in the entire operation status data shown in FIG. 2 and FIG. 3, but the index can also be calculated based on data of a specific time range extracted from the operation status data.

For example, in FIG. 3, among a plurality of time ranges associated with the same product or component (e.g., the time range from the timing T1 to the timing T2 and the time range from the timing Tn to the timing Tn+1 associated with the product 1), the skill exertion of the same operator A may differ due to performance deterioration resulting from fatigue over time or habituation over time.

Further, in FIG. 3, among a plurality of time ranges associated with different products or components, the skill exertion of the same operator A may differ depending on his/her strengths and weaknesses. For example, in FIG. 3, in the time range from the timing T11 to the timing T12 associated with the component 3, since the no-operation time is shorter as compared to the time range from the timing T14 to the timing T15 associated with the component 6, the exertion for the component 3 may be higher than that for the component 6.

According to the skill evaluation device 10 of the present embodiment, based on time range information acquired by the operation of an input part 10e, data of a specific time range is extracted from the operation status data shown in FIG. 2 and FIG. 3, and the index of the skill of the operator A can be calculated for one or more evaluation items based on the extracted data of the specific time range. Accordingly, since the time range to be evaluated is controlled based on the operation of the input part 10e, skill evaluation can be effectively performed for the same operator A.

§ 2 Configuration Example

Functional Configuration

Figure 4:
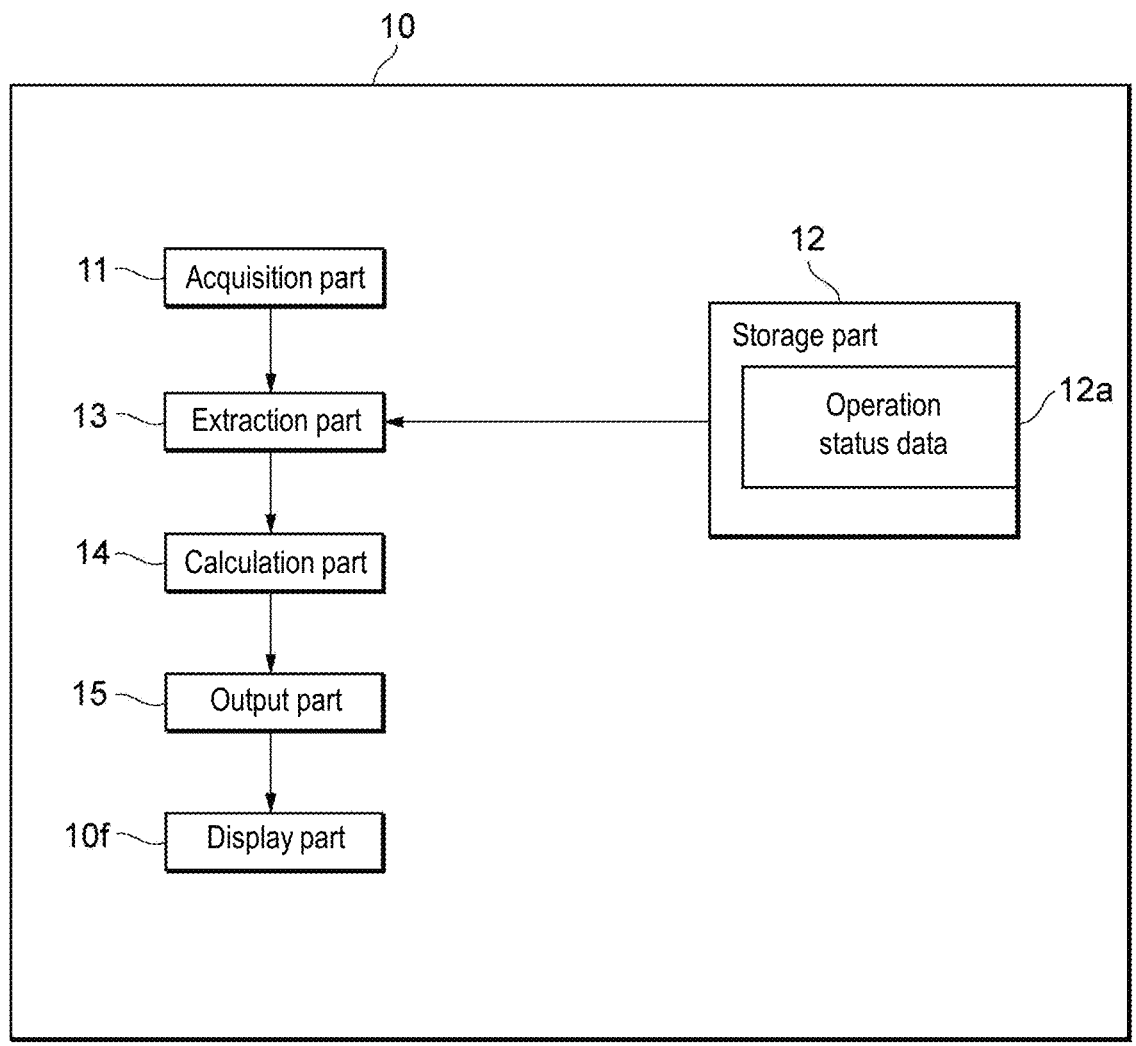
FIG. 4 is a view showing functional blocks of the skill evaluation system according to the present embodiment.

Next, an example of the functional configuration of the skill evaluation system 100 according to the present embodiment will be described with reference to FIG. 4. The skill evaluation system 100 includes a skill evaluation device 10. The skill evaluation device 10 includes an acquisition part 11, a storage part 12, an extraction part 13, a calculation part 14, an output part 15, and a display part 10f.

Acquisition Part

The acquisition part 11 acquires time range information indicating an arbitrary time range. Specifically, the acquisition part 11 may acquire the time range information indicating the arbitrary time range according to an operation of the input part 10e by the user. Herein, the arbitrary time range may be a time range arbitrarily selected from the operation status data (e.g., FIG. 3) displayed and arranged on a time axis on the display part 10f. Alternatively, the arbitrary time range may be, for example, selected from predetermined time ranges such as morning, afternoon, one day, one week, one month, one year, etc., or may be a time range (e.g., 9 am to 10 am) inputted by the input part 10e.

In addition, the acquisition part 11 may acquire evaluation unit information indicating an evaluation unit of skill. Specifically, the acquisition part 11 may acquire the evaluation unit information indicating the evaluation unit of the skill of the operator A according to the operation of the input part 10e by the user. Herein, the evaluation unit is, for example, a specific product (e.g., at least one of the products 1 to 3), a specific component (e.g., at least one of the components 1 to 7), or may be a specific operation (e.g., at least one of holding, storing, transporting, adjusting, inspecting, etc.). The evaluation unit may be selected or inputted through the operation of the input part 10e by the user.

Storage Part

The storage part 12 stores operation status data 12a indicating the operation status of the operator A in a time series. Details of the operation status data 12a are as described in FIG. 2.

Extraction Part

From the operation status data 12a stored in the storage part 12, the extraction part 13 extracts data of a specific time range determined based on the time range information acquired by the acquisition part 11. For example, from the operation status data 12a, the extraction part 13 may extract data of a specific time range that at least partially overlaps with the time range indicated by the time range information. In other words, the data of the specific time range may be data in the exact time range indicated by the time range information, or may be data in a time range that partially overlaps with the time range indicated by the time range information.

Further, the extraction part 13 may extract the data of the specific time range determined based on the time range information and the evaluation unit information acquired by the acquisition part 11. Specifically, based on the evaluation unit information, the extraction part 13 determines the data of the specific time range that at least partially overlaps with the time range indicated by the time range information, and may extract the data of the specific time range from the operation status data 12a.

The data of the specific time range may be data within the time range indicated by the time range information excluding data unassociated with the evaluation unit. Further, the data of the specific time range may be data associated with the evaluation unit within a predetermined period (e.g., one minute) adjacent to the time range indicated by the time range information. Moreover, the data of the specific time range may be data associated with the evaluation unit indicated by the evaluation unit information within the time range indicated by the time range information.

Calculation Part

The calculation part 14 calculates an index value of the skill of the operator A for one or more evaluation items based on the data of the specific time range extracted by the extraction part 13. The evaluation item is, for example, efficiency, a specific operation (e.g., holding, transporting, adjusting, or inspecting), a parallel operation, a hand rhythm, and the like. In addition, the evaluation item may be a part of the above and may include other evaluation items.

Specifically, the calculation part 14 may calculate an index value for a first evaluation item (e.g., efficiency) based on a waste time determined based on the data of the specific time range. Herein, the waste time may be calculated based on a ratio between a total of the time (non-operating time) indicating that a predetermined part (e.g., both the right hand and the left hand) is in a non-operating status within the specific time range, and the overall time corresponding to the specific time range.

The calculation part 14 can determine the non-operating time based on the start time and the end time associated with N/A (non-operating status) among the data within the specific time range. For example, in FIG. 2, N/A of the left hand and the right hand overlaps between 00:24:00 and 00:24:30 (hour:minute:second). Therefore, the non-operating time is 0.5 minutes. For example, in FIG. 2, in the case where the specific time range is 26 minutes, from 00:00 to 00:26 (hour:minute), the waste time may be indicated by 0.5/26 (minutes).

In addition, the calculation part 14 may calculate an index value for a second evaluation item (e.g., a specific operation such as holding, transporting, adjusting, or inspecting) based on at least one of a number of matches of procedures, a number of procedures, a total of reference time, a total of execution time, a reference time of each operation, and an execution time of each operation, which are determined based on the data of the above specific time range.

Herein, the number of matches of procedures is the number of matches with the procedures executed in a predetermined order within the specific time range. The number of procedures is the number of procedures within the specific time range. One procedure may correspond to one or more parts, may correspond to one or more products, or may correspond to one or more operations associated with a certain product or part. The calculation part 14 may calculate a first value (e.g., a value C associated with a "correctness of procedure") based on the number of matches of procedures and the number of procedures.

Further, the reference time is a time as reference for executing each procedure within the specific time range and is determined in advance. The execution time is the time in which the operator A executes each procedure within the specific time range. The calculation part 14 may calculate a second value (e.g., a value T associated with a "total time") based on the total of the reference time and the total of the execution time within the specific time range.

In addition, the calculation part 14 may calculate a third value (e.g., a value V associated with a "time variation") based on the reference time and the execution time of each procedure within the specific time range, and the number of procedures within the specific time range. The calculation part 14 may calculate the index value (e.g., an index value E) for the second evaluation item (e.g., a specific operation such as holding, transporting, adjusting, or inspecting) based on the first value, the second value, and the third value.

Further, the calculation part 14 may calculate an index value for a third evaluation item (e.g., a parallel operation) based on a parallel time determined based on the data of the specific time range. Herein, the parallel time is the time in which different parts of the operator A (e.g., the right hand and the left hand) are in different operation statuses at the same time. For example, in FIG. 2, between 00:10 and 00:12 (hour:minute), the left hand of the operator A performs a transporting operation, while the right hand performs a holding operation, so the parallel time is 2 minutes. For example, in FIG. 2, in the case where the specific time range is 26 minutes, from 00:00 to 00:26 (hour:minute), the ratio of the parallel time may be indicated by 2/26 (minutes).

In addition, the calculation part 14 may calculate an index value for a fourth evaluation item (e.g., a hand rhythm) based on an execution time of a repetitive operation determined based on the data of the specific time range. Herein, the repetitive operation may involve a same product, a same component, or a same operation which is performed multiple times. For example, in the case where the specific time range is a time range from the timing T1 to the timing T2, the calculation part 14 may calculate the index value for the hand rhythm of performing a specific operation based on the execution time and the reference time of the specific operation (e.g., an adjusting operation) which is performed repetitively associated with the product 1, and the number of times of the specific operation in the product 1.

Output Part

The output part 15 outputs index information indicating the index value of the skill of the operator A for one or more evaluation items calculated by the calculation part 14. The output part 15 may output the index information by using, for example, a radar chart. Further, in the case where the data of the specific time range extracted by the extraction part 13 corresponds to a plurality of time ranges, the output part 15 may output a plurality of radar charts respectively corresponding to the plurality of time ranges. The index value and the index information may also be respectively interpreted as an evaluation value and evaluation information.

Display Part

The display part 10*f* may display the index information outputted from the output part 15. Further, the display part 10*f* may display the operation status data 12*a* stored in the storage part 12 on the time axis.

Hardware Configuration

Figure 5:
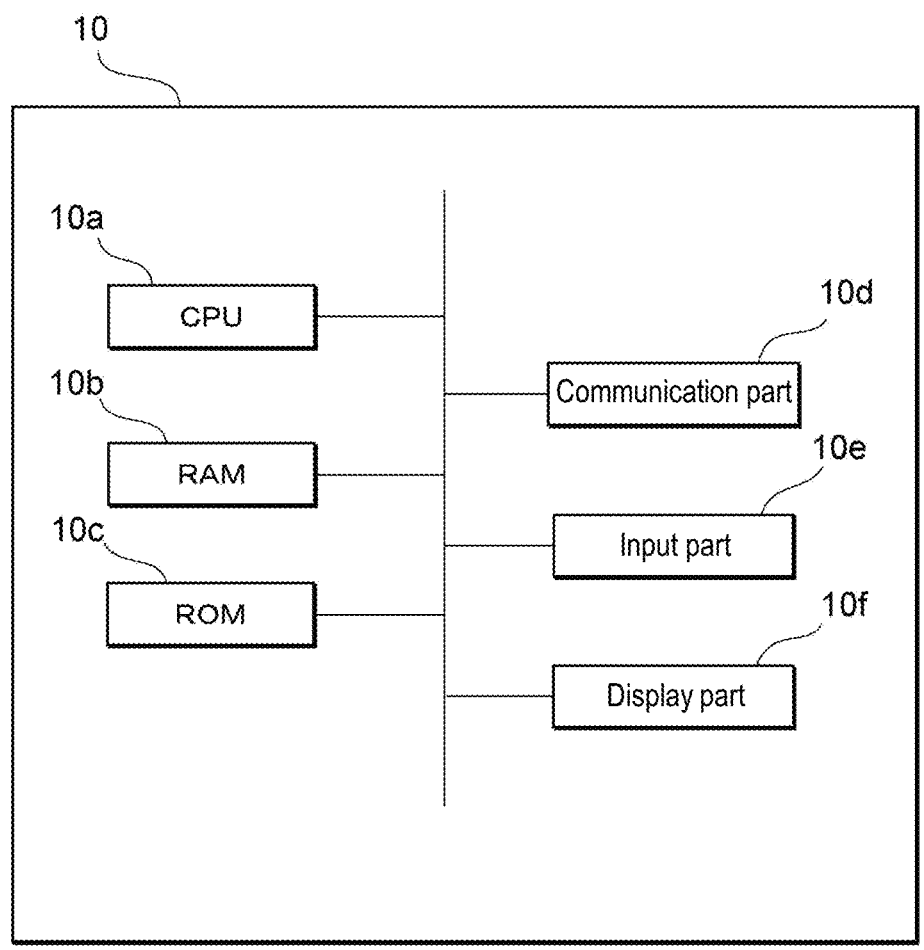
FIG. 5 is a view showing a physical configuration of a skill evaluation device according to the present embodiment.

Next, an example of the hardware configuration of the skill evaluation device 10 according to the present embodiment will be described with reference to FIG. 5. The skill evaluation device 10 includes a CPU (central processing unit) 10*a* equivalent to a computation device, a RAM (random access memory) 10*b* equivalent to the storage part 12, a ROM (read only memory) 10*c* equivalent to the storage part 12, a communication part 10*d*, an input part 10*e*, and a display part 10*f*. These respective configurations are connected to each other via a bus so that data can be transmitted and received. In addition, while the case where the skill evaluation device 10 is configured by one computer will be described in this example, the skill evaluation device 10 may also be implemented by using a plurality of computers.

The CPU 10*a* is a control part which controls the execution of programs stored in the RAM 10*b* or the ROM 10*c* and computes and processes data. The CPU 10*a* is a computation device which executes a program (skill evaluation program) for evaluating the skill of the operator A based on the data of the specific time range extracted from the operation status data 12*a*. In the case where the skill evaluation device 10 is configured by a plurality of computers, for example, the calculation of the index value of the skill of the operator A for one or more evaluation items may be executed by a computer on the cloud, and the output of the index information indicating the index value may be executed by a local computer. The CPU 10*a* receives various input data from the input part 10*e* and the communication part 10*d*, displays a calculation result of the input data on the display part 10*f*, and stores it in the RAM 10*b* or the ROM 10*c*.

The RAM 10*b* forms a data rewritable portion of the storage part 12 and may be configured by, for example, a semiconductor storage element. The RAM 10*b* stores data such as the skill evaluation program executed by the CPU 10*a* and the operation status data 12*a*.

The ROM 10*c* forms a data readable portion of the storage part 12 and may be configured by, for example, a semiconductor storage element. The ROM 10*c* stores, for example, a motion analysis program and non-rewritable data.

The communication part 10*d* is an interface which connects the skill evaluation device 10 to an external device. The communication part 10*d* may be connected to the image capturing part 20 via, for example, a LAN (local area network) to receive the moving image or the operation status data 12*a* from the image capturing part 20. In addition, the communication part 10*d* may also be connected to the Internet to receive the moving image or the operation status data 12*a* via the Internet.

The input part 10*e* receives input of data from the user and may include, for example, a keyboard, a mouse, and a touch panel.

The display part 10*f* visually displays the computation result obtained by the CPU 10*a* and may be configured by, for example, an LCD (liquid crystal display).

The skill evaluation program may be stored in a computer-readable storage medium such as the RAM 10*b* or the ROM 10*c* and provided, or may be provided via a communication network connected by the communication part 10*d*. In the skill evaluation device 10, with the CPU 10*a* executing the motion analysis program, the operations of the acquisition part 11, the extraction part 13, the calculation part 14, and the output part 15 described with reference to FIG. 4 are implemented. It is noted that the above physical configurations are merely examples and do not necessarily have to be independent configurations. For example, the skill evaluation device 10 may include an LSI (large-scale integration) in which the CPU 10a, the RAM 10b, and the ROM 10c are integrated.

§ 3 Operation Example

Input Operation

An example of the input operation of the time range information and the evaluation unit information with respect to the skill evaluation device 10 according to the present embodiment will be described with reference to FIG. 6 and FIG. 7.

Figure 6:
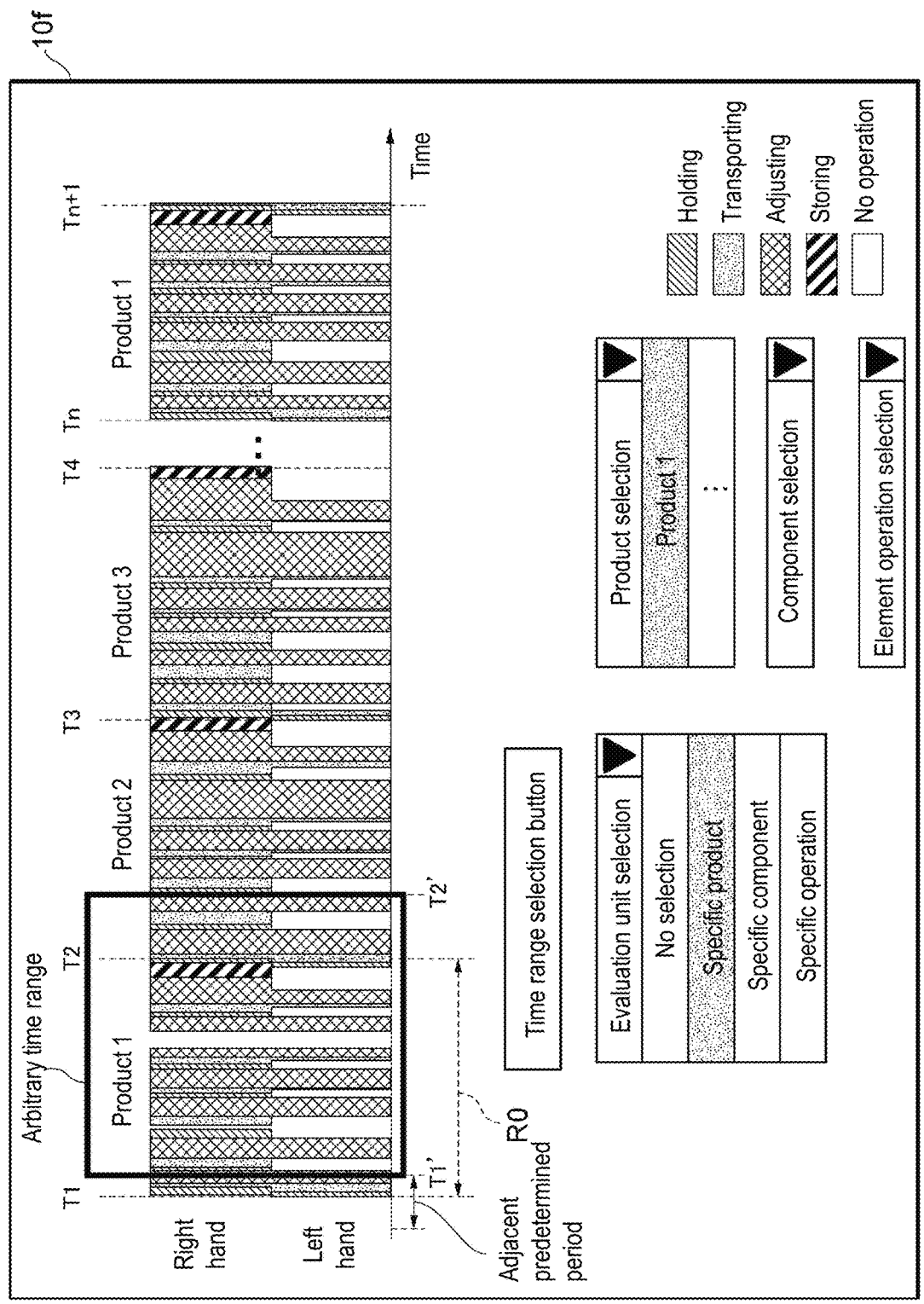
FIG. 6 is a view showing an example of an input screen displayed on a display part of the skill evaluation device according to the present embodiment.

FIG. 6 is a view showing an example of an input screen displayed on the display part 10f according to the present embodiment. In the input screen shown in FIG. 6, the operation status data 12a for each predetermined part (herein, each of the right hand and the left hand) are displayed on a time axis. Through the operation of the input part 10e by the user, an arbitrary time range is selected from the operation status data 12a displayed on the time axis. When the time range selection button is pressed through the operation of the input part 10e by the user, the acquisition part 11 may obtain the time range information indicating the selected arbitrary time range.

In addition, in the input screen displayed on the display part 10f, information for selecting or inputting the evaluation unit of the skill of the operator A (e.g., a pull-down menu, a check box, etc.) may be displayed. For example, in the input screen shown in FIG. 6, a pull-down menu for selecting a specific product (e.g., at least one of the products 1 to 3), a specific component (e.g., at least one of the components 1 to 7), or a specific operation (e.g., at least one of holding, storing, transporting, adjusting, inspecting, etc.) as the evaluation unit is displayed. The acquisition part 11 may acquire evaluation unit information indicating the evaluation unit that is selected or inputted.

The extraction part 13 may determine the data of the specific time range extracted from the operation status data 12a based on the time range information and the evaluation unit information acquired by the acquisition part 11. Specifically, from the operation status data 12a, the extraction part 13 may extract the data of a specific time range which is associated with the evaluation unit indicated by the evaluation unit information and at least partially overlaps with the time range indicated by the time range information.

For example, in FIG. 6, instead of the time range R0 associated with the product 1 from the timing T1 to the timing T2, a time range from a timing T1' after the timing T1 to a timing T2' after the timing T2 is selected as the arbitrary time range through the operation of the input part 10e by the user. Further, the product 1 is selected as the evaluation unit.

In that case, within the time range from the timing T1' to the timing T2' indicated by the time range information, the extraction part 13 may extract the data in the time range from the timing T1' to the timing T2 from the operation status data 12a, excluding the data unassociated with the product 1 indicated by the evaluation unit information in the time range from the timing T2 to the timing T2'. In addition, together with the data in the time range from the timing T1' to the timing T2, the extraction part 13 may extract the data associated with the product 1 in the time range from the timing T1 to the timing T1' in a predetermined period (e.g., one minute) adjacent to the time range indicated by the timing T1' to the timing T2'. Accordingly, the extraction part 13 can extract the data of the time range R0 associated with the product 1 indicated by the evaluation unit information.

According to the skill evaluation device 10 of the present embodiment, in the case where the arbitrary time range is selected through the operation of the input part 10e by the user, the selected time range (e.g., the time range indicated by the timing T1' to the timing T2' in FIG. 6) can be adjusted to a time range that matches the evaluation unit (e.g., the time range R0 in FIG. 6). Therefore, it is possible to prevent deterioration in the accuracy of evaluation of the skill of the operator A due to an operation error of the input part 10e.

Figure 7:
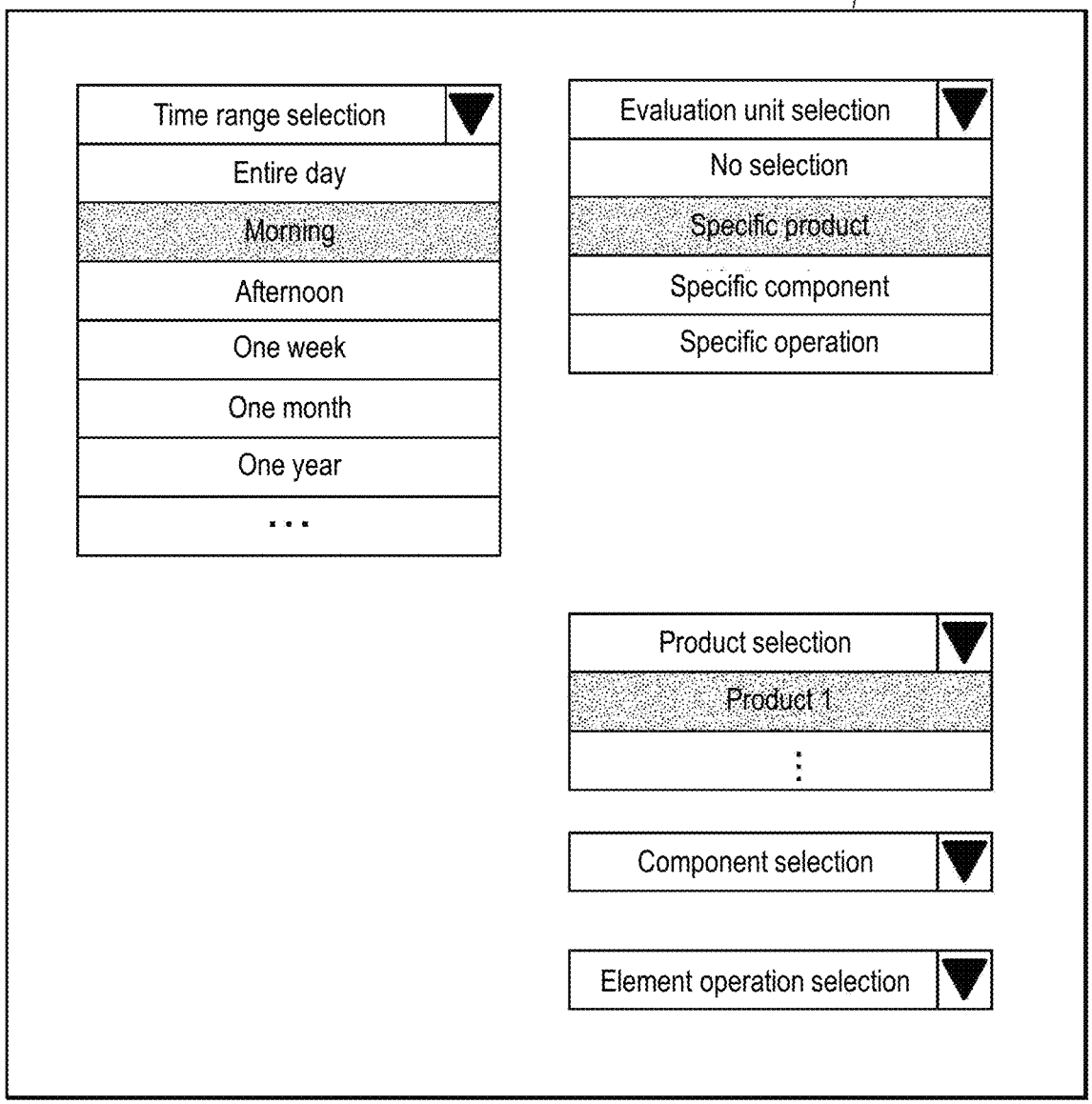
FIG. 7 is a view showing another example of the input screen displayed on the display part of the skill evaluation device according to the present embodiment.

FIG. 7 is a view showing another example of the input screen displayed on the display part 10f according to the present embodiment. The input screen shown in FIG. 7 differs from that in FIG. 6 in that the operation status data 12a for each predetermined part are not displayed on a time axis.

In the input screen shown in FIG. 7, information for selecting or inputting the arbitrary time range (e.g., a pull-down menu, a check box, etc.) may be displayed. For example, in FIG. 7, through an operation of the input part 10e by the user, a specific year, a specific month, a specific week, a specific day, or a specific time zone is selected or inputted as the arbitrary time range. The specific year, month, week, day, or time zone may be selected or inputted through the operation of the input part 10e by the user. The acquisition part 11 may acquire the time range information indicating the time range that is selected or inputted.

In the input screen in FIG. 7, as in FIG. 6, through an operation of the input part 10e by the user, a specific product, a specific component, or a specific operation is selected or inputted as the evaluation unit. The acquisition part 11 may acquire the evaluation unit information indicating the evaluation unit that is selected or inputted.

For example, in FIG. 7, "morning" is selected through the operation of the input part 10e by the user. Further, the product 1 is selected as the evaluation unit. The acquisition part 11 acquires time range information indicating "morning" and evaluation unit information indicating "product 1". In that case, the extraction part 13 may extract the data associated with "morning" and "product 1" from the operation status data 12a as the data of the specific time range.

Accordingly, according to the skill evaluation device 10 of the present embodiment, even if the operation status data 12a are not displayed on the display part 10f, the data of the specific time range for evaluation of the skill of the operator A can still be appropriately determined.

Output Operation

Next, the output operation of the index information indicating the index calculated based on the data of the specific time range will be described with reference to FIG. 8 to FIG. 13. In (a) of FIG. 8 to (a) of FIG. 13, while it is assumed that the arbitrary time range is selected on the input screen shown in FIG. 6, the arbitrary time range may be selected without being based on the operation status data 12a displayed on the display part 10f, as described in FIG. 7.

Figure 8:
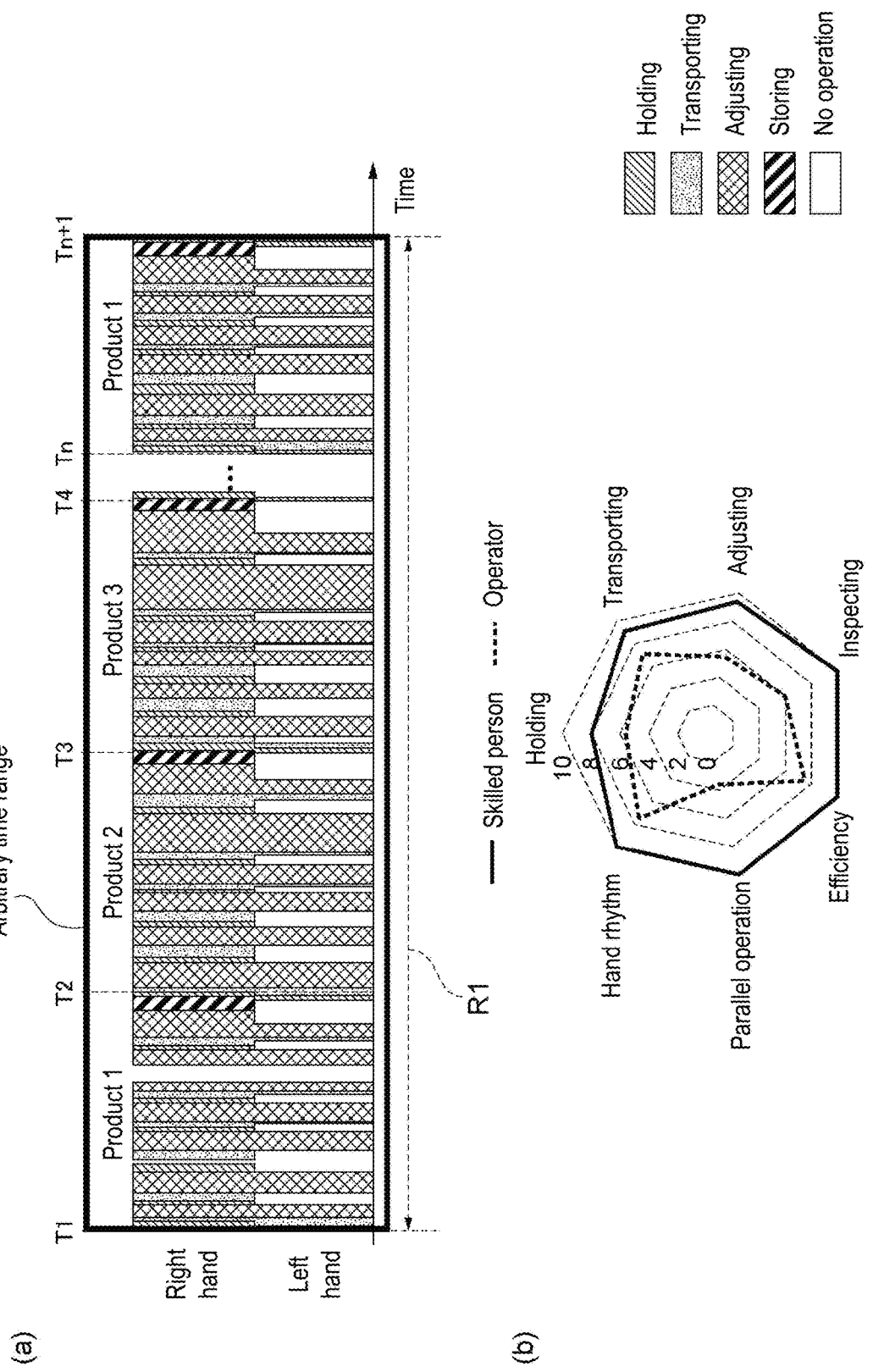
FIG. 8 is a view showing a first example of index information outputted by the skill evaluation device according to the present embodiment.
Figure 13:
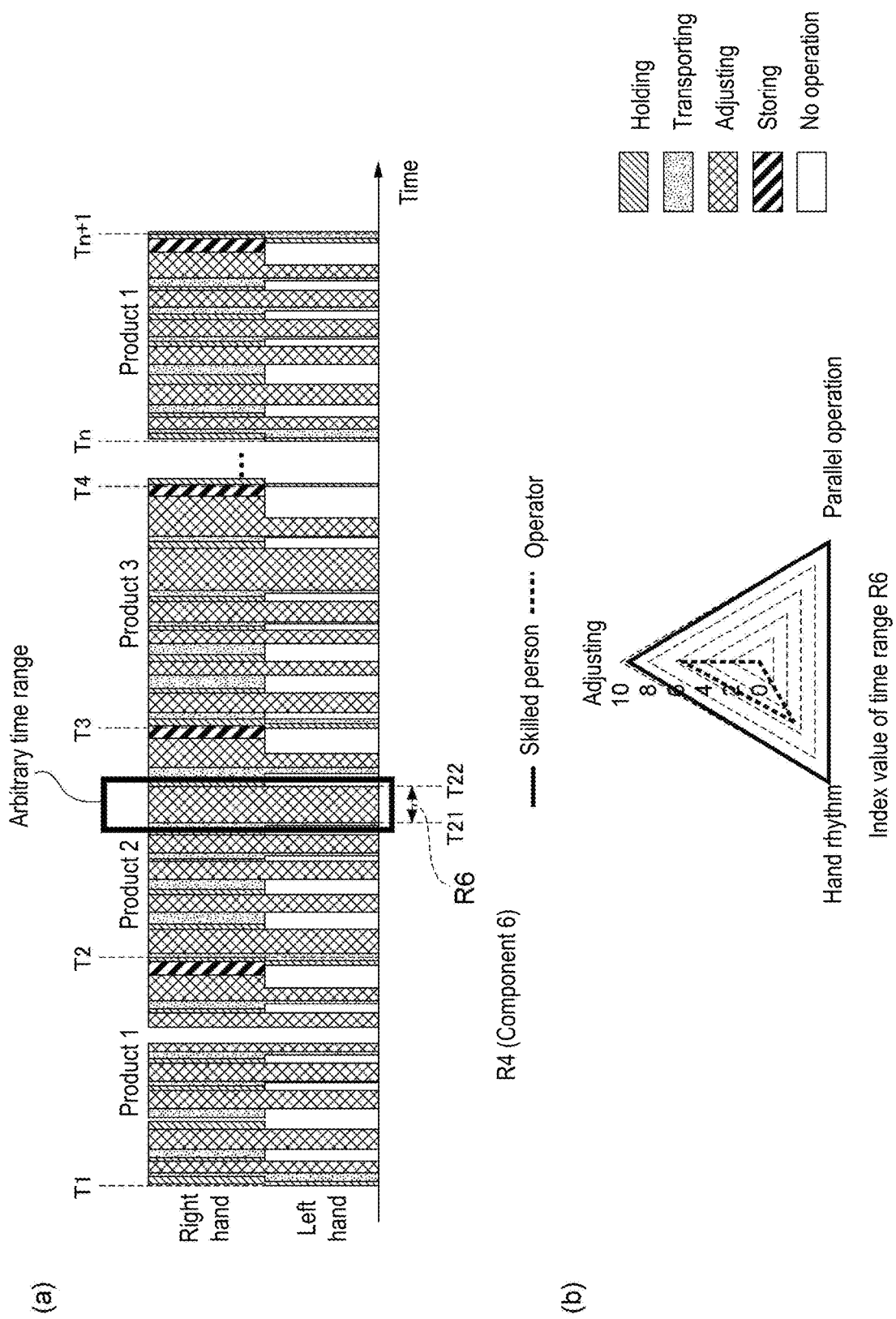
FIG. 13 is a view showing a sixth example of the index information outputted by the skill evaluation device according to the present embodiment.

Further, the evaluation items shown in (b) of FIG. 8 to (b) of FIG. 13 are merely examples, and the disclosure is not limited thereto. In addition, in (b) of FIG. 8 to (b) of FIG. 13, while it is assumed that the index information indicating the index value for each evaluation item is outputted as a radar chart, the output form of the index information is not limited to the radar chart. Also, in (b) of FIG. 8 to (b) of FIG. 13, while not only each index value of the operator A but also each index value of a skilled person is displayed, the disclosure is not limited thereto, and it is also possible that only each index value of the target operator A is displayed.

(a) of FIG. 8 shows an example of a case where the time range R1 from the timing T1 to the timing Tn+1 (n>1) is selected on the input screen, and "no selection (i.e., covering the entire time range)" is selected as the evaluation unit. In that case, while acquiring the time range information, the acquisition part 11 does not need to acquire the evaluation unit information. In the case shown in (a) of FIG. 8, the extraction part 13 may extract the data of the time range R1 indicated by the time range information from the operation status data 12a.

(b) of FIG. 8 shows a radar chart showing index values of one or more evaluation items (herein, efficiency, holding, transporting, adjusting, inspecting, parallel operation, and hand rhythm) calculated based on the data of the time range R1.

Figure 9:
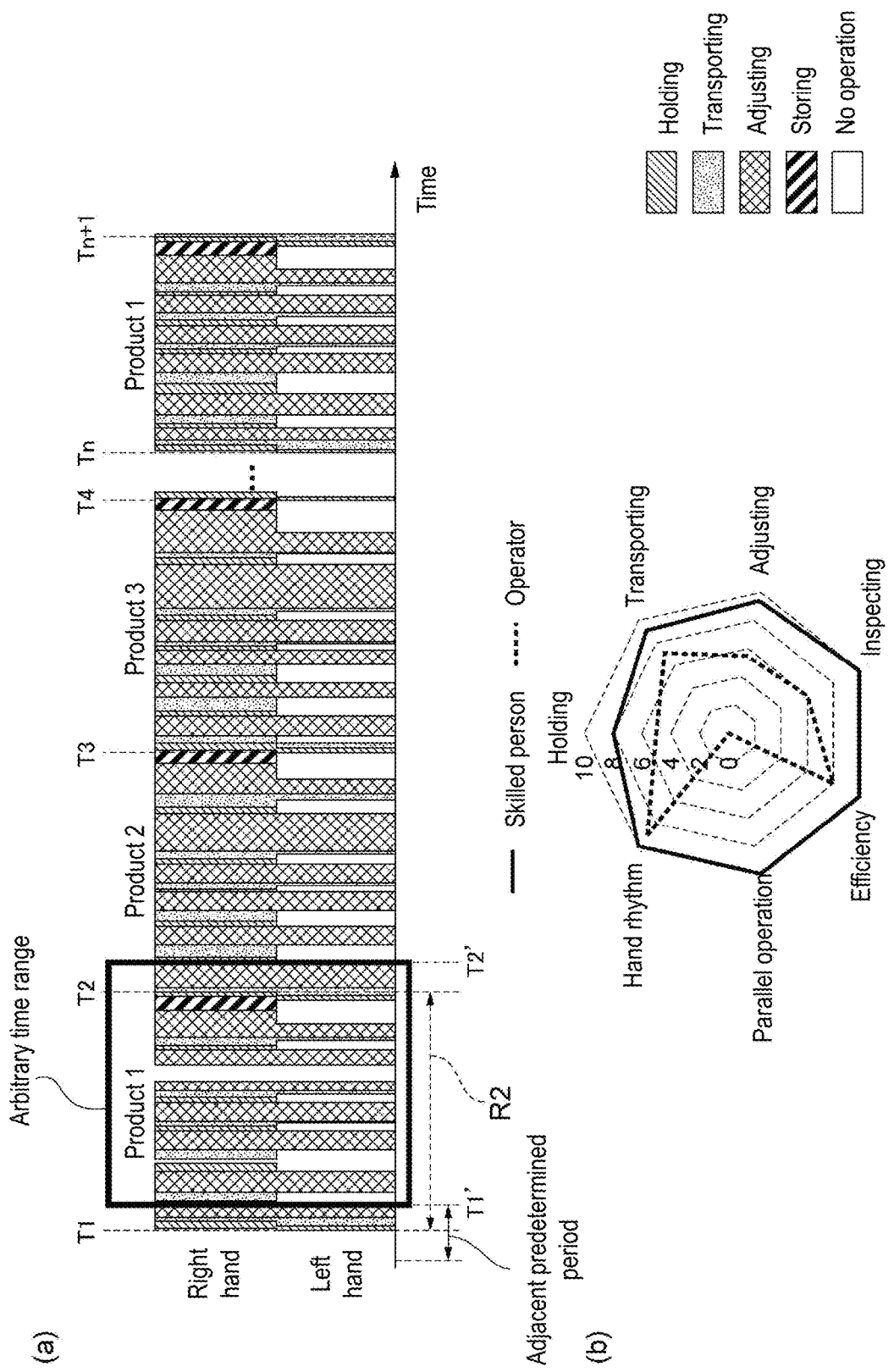
FIG. 9 is a view showing a second example of the index information outputted by the skill evaluation device according to the present embodiment.

(a) of FIG. 9 shows an example of a case where the time range from the timing T1' to the timing T2' is selected on the input screen, and "product 1" is selected as the evaluation unit. Based on the evaluation unit information indicating "product 1", the extraction part 13 may determine the data of a time range R2 which at least partially overlaps with the time range from the timing T1' to the timing T2' indicated by the time range information, and extract the data from the operation status data 12a. For example, in (a) of FIG. 9, the data unassociated with "product 1" in the time range from the timing T2 to the timing T2' are excluded, and the data associated with "product 1" in the time range from the timing T1 to the timing T1' within a predetermined period adjacent to the time range indicated by the time range information are added. Accordingly, the extraction part 13 may extract the data associated with "product 1" in the time range R2 from the timing T1 to the timing T2.

(b) of FIG. 9 shows a radar chart showing index values of one or more evaluation items (herein, efficiency, holding, transporting, adjusting, inspecting, parallel operation, and hand rhythm) calculated based on the data of the time range R2. For example, the index value of "hand rhythm" of the time range R2 associated with the product 1 shown in (b) of FIG. 9 is improved as compared to that of the time range R1 shown in (b) FIG. 8. Therefore, it can be determined that the operator A executes the operation associated with the product 1 at a rhythm better than in other products.

Figure 10:
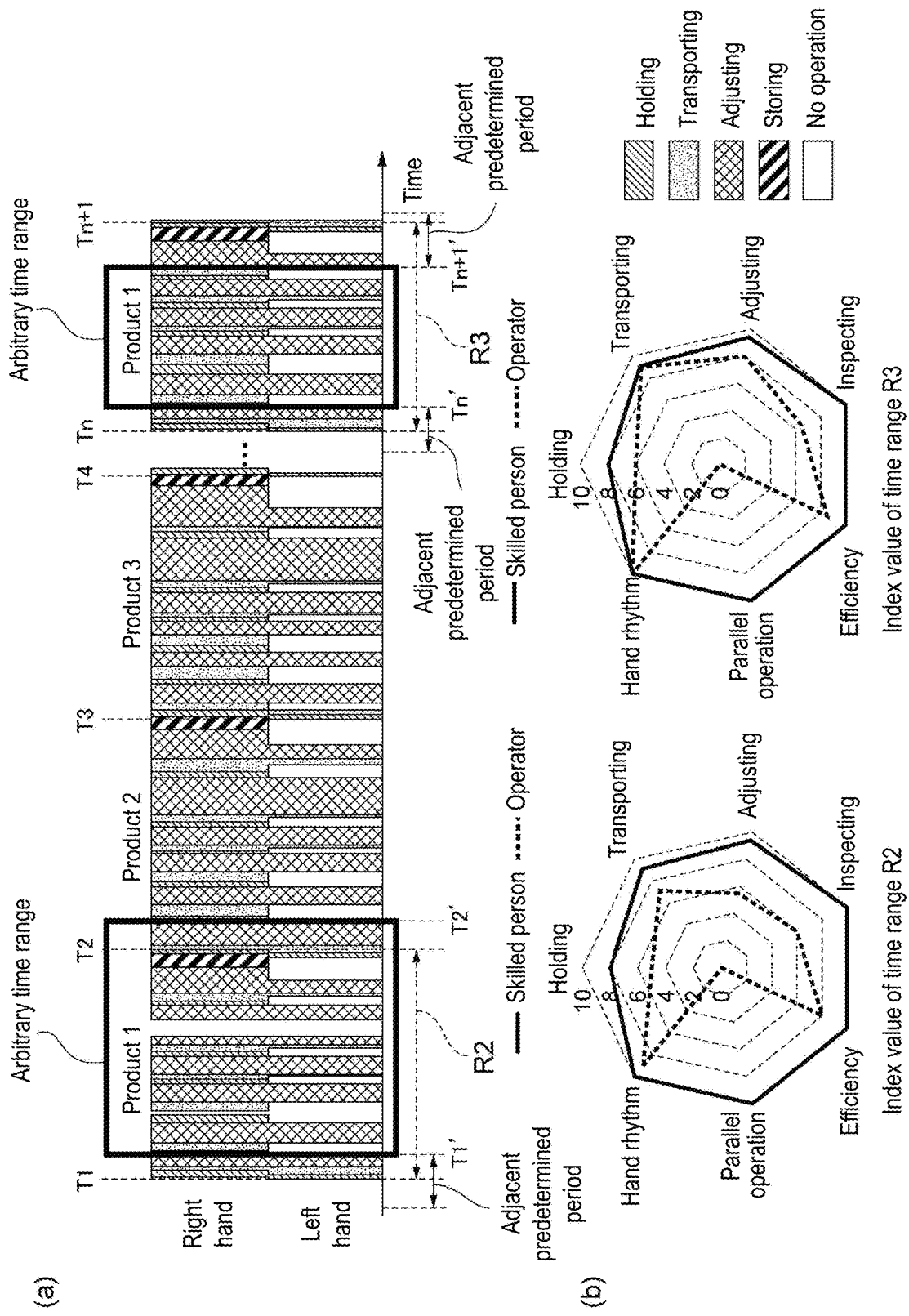
FIG. 10 is a view showing a third example of the index information outputted by the skill evaluation device according to the present embodiment.

(a) of FIG. 10 shows an example of a case where, in addition to the time range from the timing T1' to the timing T2', the time range from a timing Tn' to a timing Tn+1' is selected on the input screen, and "product 1" is selected as the evaluation unit. As such, a plurality of time ranges may be selected on the input screen.

In (a) of FIG. 10, as described in (a) of FIG. 9, the extraction part 13 extracts the data of the time range R2 determined based on the evaluation unit information indicating "product 1" from the operation status data 12a. Also, based on the evaluation unit information, the extraction part 13 may determine the data of a time range R3 which at least partially overlaps with the time range from the timing Tn' to the timing Tn+1' indicated by the time range information, and extract the data from the operation status data 12a.

For example, in (a) of FIG. 10, within a predetermined period adjacent to the time range from the timing Tn' to the timing Tn+1' (herein, the preceding and subsequent adjacent predetermined periods), the extraction part 13 extracts the data in the time range from the timing Tn to the timing Tn' and the data in the time range from the timing Tn+1' to the timing Tn+1 associated with "product 1", in addition to the data in the time range from the timing Tn' to the timing Tn+1'. In other words, the extraction part 13 extracts the data of the time range R3 corresponding to "product 1".

(b) of FIG. 10 shows radar charts showing index values of one or more evaluation items (herein, efficiency, holding, transporting, adjusting, inspecting, parallel operation, and hand rhythm) calculated based on the respective data of the time ranges R2 and R3. In the case where the data of a plurality of time ranges dispersed in the time direction are extracted, the output part 15 may output radar charts respectively corresponding to the plurality of time ranges. For example, in (b) of FIG. 10, the index values of "hand rhythm", "transporting", and "adjusting" in the time range R3 are improved as compared to those in the time range R2. Accordingly, it is possible to evaluate the temporal change of the operator A with respect to the same product.

While (b) of FIG. 10 shows an example in which respective index information of a plurality of time ranges corresponding to the same product is outputted, the disclosure is not limited thereto. Although not shown, respective index information of a plurality of time ranges corresponding to different products may also be outputted. Accordingly, it is possible to evaluate skill differences among products (e.g., a strength product, a weakness product, etc.) for the operator A.

Figure 11:
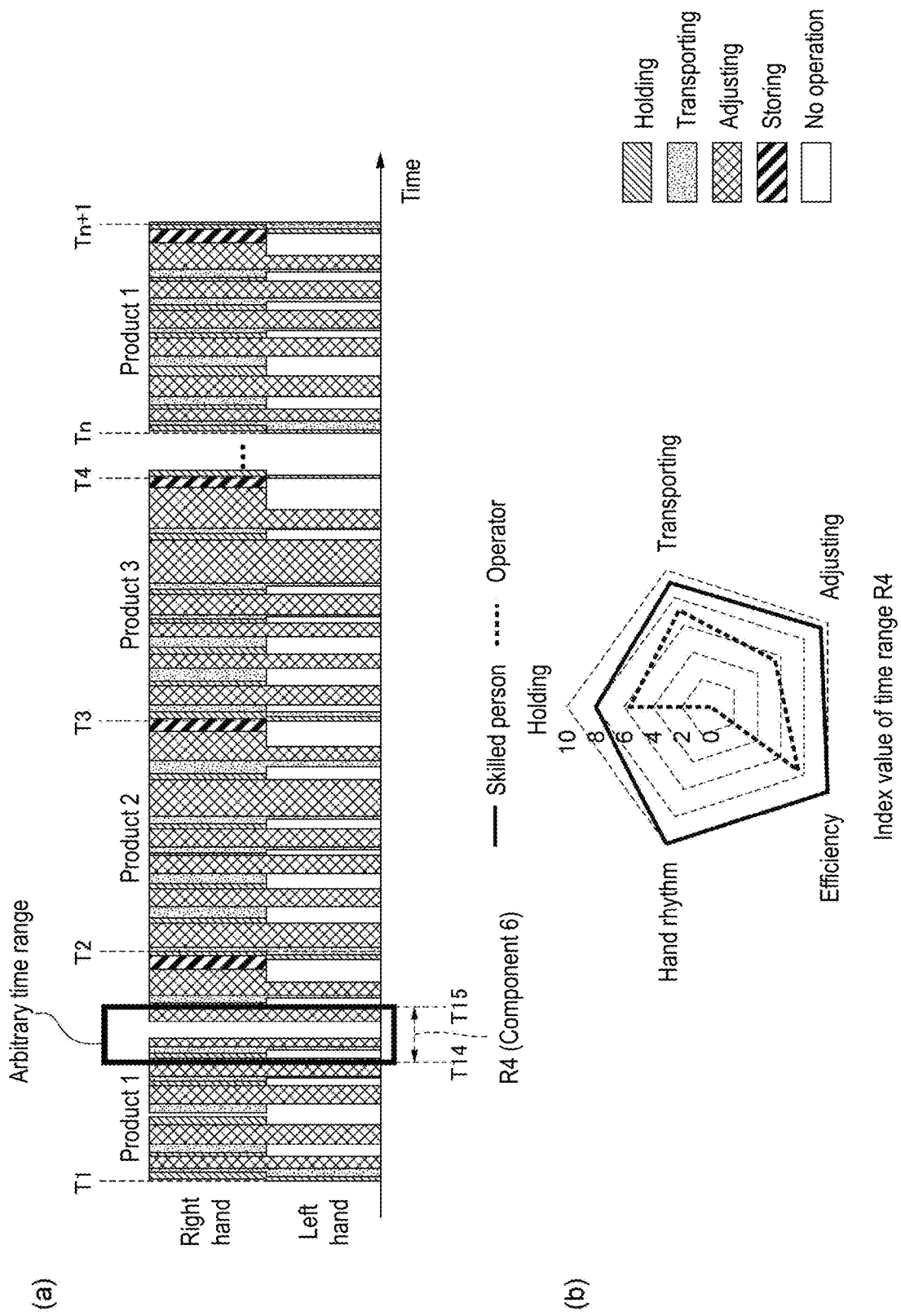
FIG. 11 is a view showing a fourth example of the index information outputted by the skill evaluation device according to the present embodiment.

(a) of FIG. 11 shows an example of a case where the time range from a timing T14 to a timing T15 is selected on the input screen, and "component 6" is selected as the evaluation unit. Based on the evaluation unit information indicating "component 6", the extraction part 13 may determine the data of a time range R4 which at least partially overlaps with the time range from the timing T14 to the timing T15 indicated by the time range information, and extract the data from the operation status data 12a.

Although not shown, also in the case where a specific component is selected as the evaluation unit, based on the evaluation unit information indicating the specific component (e.g., the component 6), data unassociated with the specific component within the time range indicated by the time range information may be excluded from the data of the specific time range extracted from the operation status data 12a. Similarly, data associated with the specific component within a predetermined period adjacent to the time range may be added to the data of the specific time range extracted from the operation status data 12a.

(b) of FIG. 11 shows a radar chart showing index values of one or more evaluation items (herein, efficiency, holding, transporting, adjusting, and hand rhythm) calculated based on the data of the time range R4. In addition, based on the evaluation unit information, the calculation part 14 may control the types of evaluation items for calculating the index values. For example, in contrast to the case where the evaluation unit is a specific product (e.g., the product 1) as shown in (b) of FIG. 9 and the evaluation items of inspecting and parallel operation are included, in the case where the evaluation unit is a specific component (e.g., the component 6) as shown in (b) of FIG. 11, it is possible not to include the evaluation items of inspecting and parallel operation.

Figure 12:
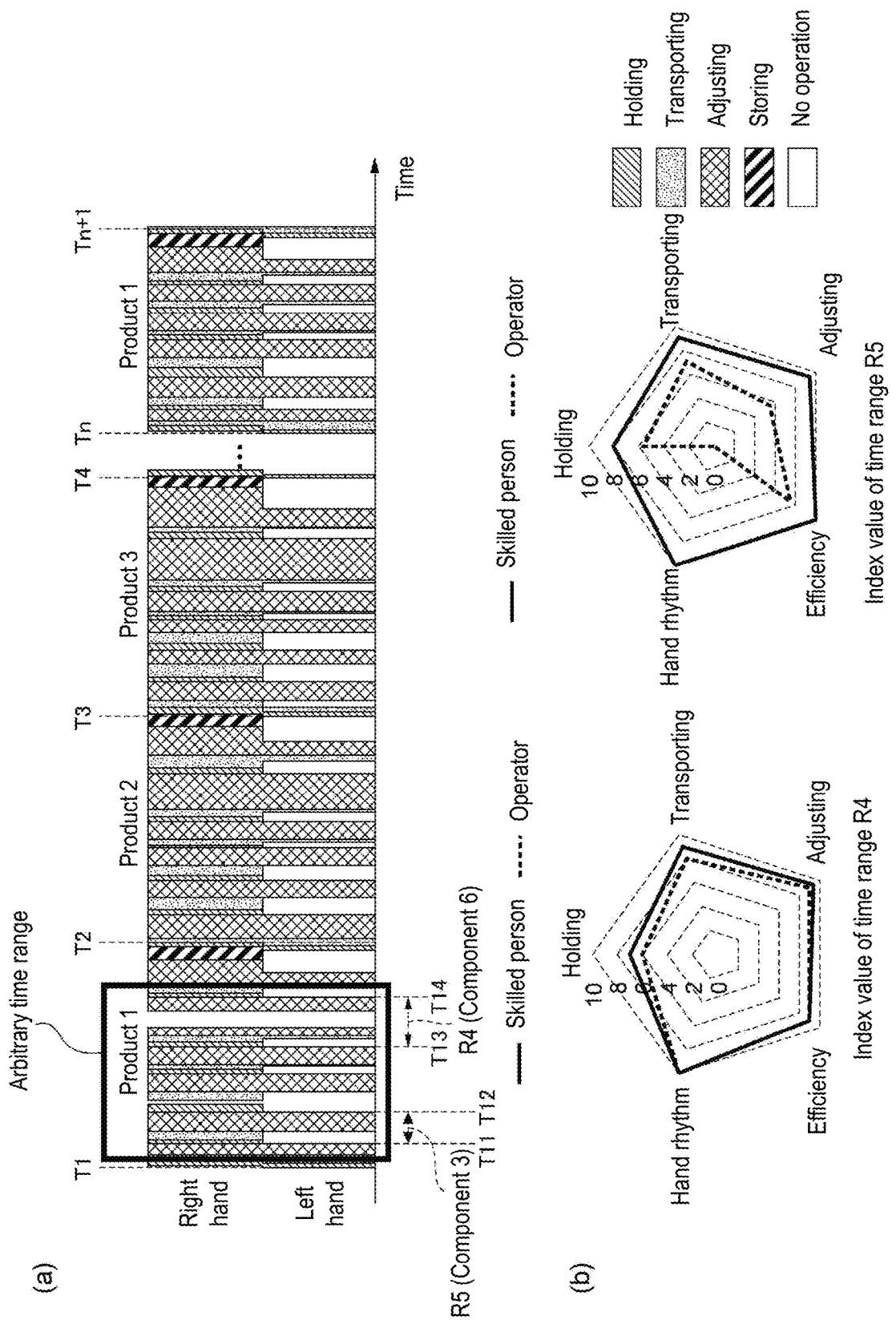
FIG. 12 is a view showing a fifth example of the index information outputted by the skill evaluation device according to the present embodiment.

(a) of FIG. 12 shows an example of a case where an arbitrary time range is selected on the input screen, and a plurality of components (herein, "component 6" and "component 3") are selected as the evaluation unit. Based on the evaluation unit information indicating "component 6" and "component 3", the extraction part 13 may determine the data of a plurality of time ranges R4 and R5 which at least partially overlap with the time range indicated by the time range information, and extract the data from the operation status data 12a.

(b) of FIG. 12 shows a plurality of radar charts respectively showing index values of one or more evaluation items (herein, efficiency, holding, transporting, adjusting, and hand rhythm) calculated based on the data of the plurality of time ranges R4 and R5. As shown in (b) of FIG. 12, by outputting respective index information of a plurality of time ranges corresponding to different components, it is possible to evaluate skill differences among components (e.g., a strength component, a weakness component, etc.) for the operator A.

While (b) of FIG. 12 shows an example in which respective index information of a plurality of time ranges corresponding to different components is outputted, the disclosure is not limited thereto. Respective index information of a plurality of time ranges corresponding to the same component may also be outputted. Accordingly, it is possible to evaluate the temporal change of skill with respect to the same component for the operator A.

(a) of FIG. 13 shows an example of a case where an arbitrary time range is selected on the input screen, and a specific operation (herein, "adjusting") is selected as the evaluation unit. In (a) of FIG. 13, based on "adjusting" indicated by the evaluation unit information, the extraction part 13 may extract the data of a time range R6 which at least partially overlaps with the time range indicated by the time range information from the operation status data 12a.

Although not shown, also in the case where a specific operation is selected as the evaluation unit, based on the evaluation unit information indicating the specific operation (e.g., adjusting), data unassociated with the specific operation within the time range indicated by the time range information may be excluded from the data of the specific time range extracted from the operation status data 12a. Similarly, data associated with the specific operation within a predetermined period adjacent to the time range may be added to the data of the specific time range extracted from the operation status data 12a.

(b) of FIG. 13 shows a radar chart showing index values of one or more evaluation items (herein, efficiency, adjusting, and hand rhythm) calculated based on the data of the time range R6. As shown in (b) of FIG. 13, in the case where the evaluation unit is a specific operation (e.g., adjusting), it is possible not to include evaluation items associated with other operations (e.g., transporting, inspecting, storing, holding, etc.).

While (b) of FIG. 13 shows the case where the specific operation selected as the evaluation unit is "adjusting", similarly, in the case where another operation (e.g., "holding", "transporting", "storing", "inspecting", etc.) is selected as the evaluation unit, the output part 15 can output the index information (e.g., a radar chart) indicating each index value.

Further, the output part 15 may output a plurality of pieces of index information indicating each index value calculated based on data of a plurality of time ranges corresponding to different operations. Accordingly, it is possible to evaluate skill differences among the operations (e.g., a strength operation, a weakness operation, etc.) for the operator A. Further, the output part 15 may output a plurality of pieces of index information indicating each index value calculated based on data of a plurality of time ranges corresponding to the same operation. Accordingly, it is possible to evaluate the temporal change in skill between the same operation for the operator A.

Calculation Operation

Next, the calculation operation of the index value for each evaluation item will be described with reference to FIG. 14 and FIG. 15. Calculation examples of index values of "efficiency", "specific operation", "parallel operation", and "hand rhythm" serving as the first to fourth evaluation items, for example, will be described below.

Efficiency

Figure 14:
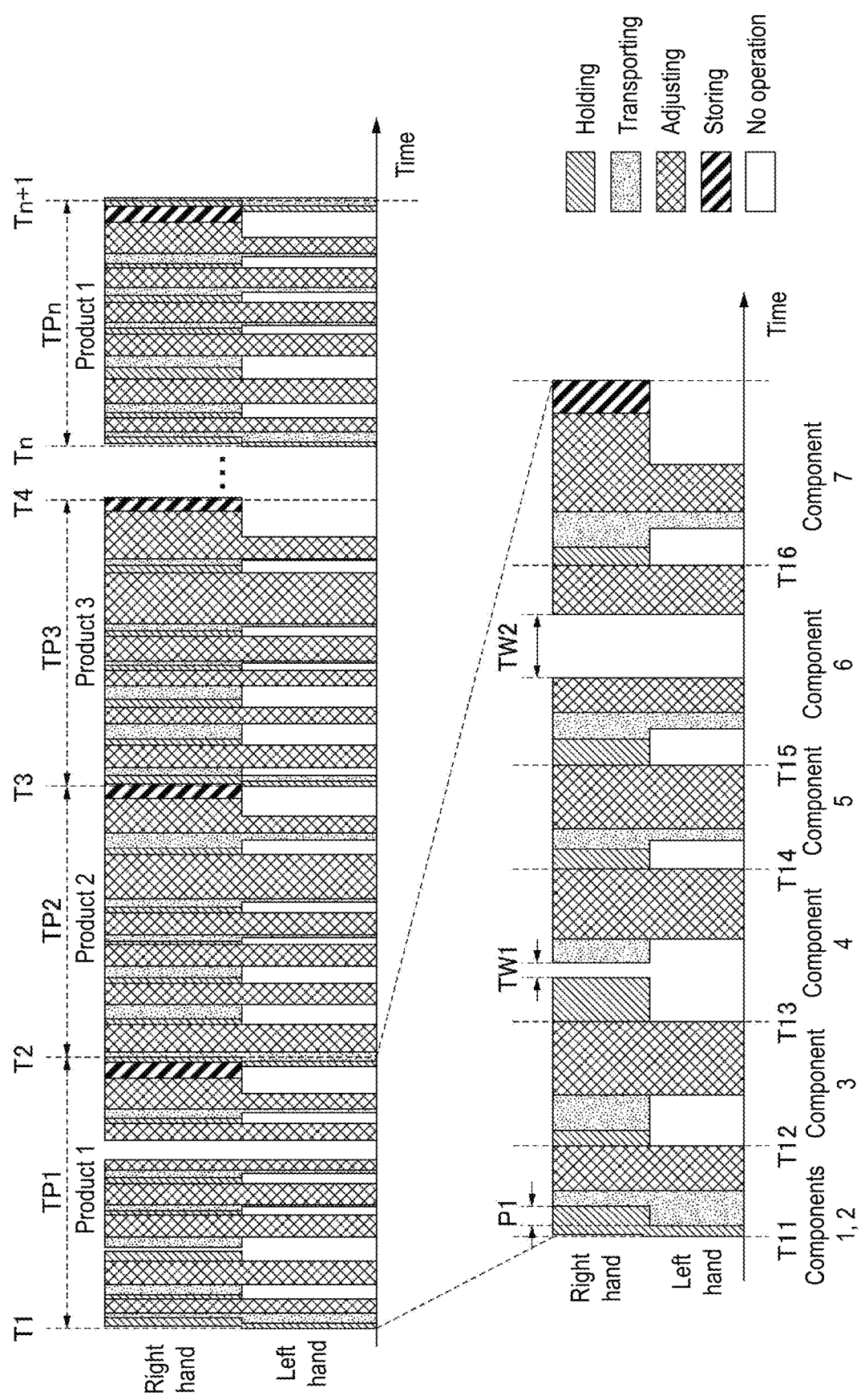
FIG. 14 is a view showing an example of calculating an index value of a first evaluation item according to the present embodiment.

FIG. 14 is a view showing an example of calculation of the index "efficiency" according to the present embodiment. As shown in FIG. 14, the index value of "efficiency" may be calculated based on the waste time in the specific time range in which data are extracted from the operation status data 12a. For example, in FIG. 14, the specific time range is a time range TP1 associated with the product 1, and the no-operation time within the time range TP1 is the total time of a no-operation time TW1 for the component 4 and a no-operation time TW2 for the component 6. Therefore, the waste time within the time range TP1 may be determined based on the total time and the time range TP1. For example, the waste time may be calculated by the following Equation (1).

Waste time within time range $TP1$=(no-operation time $TW1$+no-operation time $TW2$)/total time within time range $TP1$ (Equation 1)

Further, if the waste time within an $i^{th}$ time range TPi (e.g., i=1 to n in FIG. 14) is Wt(i), the waste time within the entire time (e.g., one day) may be determined based on the total time of the no-operation time within n time ranges and the total time of the n time ranges. For example, the waste time within the entire time may be calculated by the following Equation (2).

Mathematical Formula 1

Waste time within entire time=$\Sigma_{i=1}^{n}\{Wt(i)*TPi\}/\Sigma_{i=1}^{n}\{Wt(i)\}$ (Equation 2)

The calculation part 14 may output the index based on the waste time calculated as described above to the output part 15. For example, the calculation part 14 may convert the calculated waste time into an index value of predetermined levels (e.g., 10 levels in the case of the radar charts of (b) of FIG. 8 to (b) of FIG. 13), and output the index information indicating the converted index value to the output part 15.

Specific Operation

The calculation part 14 may calculate an index value (e.g., the index value E) for the second evaluation item (e.g., a specific operation such as holding, transporting, adjusting, or inspecting) based on the first value (e.g., the value C associated with "correctness of procedure"), the second value (e.g., the value T associated with a "total time"), and the third value, (e.g., the value V associated with "time variation).

Herein, the value C associated with the "correctness of procedure" may be calculated based on the "number of matches of procedures", which is the number of procedures matching the order of predetermined procedures within the specific time range. For example, the value C may be calculated using the following Equation (3).

$C$=(number of matches of procedures)/(number of procedures) (Equation 3)

The value T associated with the "total time" may be calculated based on the total of the execution time, which is the time in which the specific operation is executed within the specific time range. Specifically, it may be calculated using the following Equation (4), for example, based on the total of the execution time and the total of the reference time serving as the reference for executing the specific operation in each procedure.

$$T=\text{(total of execution time)}/\text{(total of reference time)} \quad \text{(Equation 4)}$$

The value V associated with the "time variation" may be calculated based on the total of the reference time, the total of the execution time, and the number of procedures. For example, if the number of procedures within the specific time range is m, the reference time of a $j^{th}$ procedure is Rt(j), and the execution time of the $j^{th}$ procedure is Pt(j), the value V may be calculated using the following Equation (5).

Mathematical Formula 2

$$V=\Sigma_{j=1}^{m}\{Rt(j)/Pt(j)\}/m \quad \text{(Equation 5)}$$

The index value E of the specific operation may be calculated based on the value C associated with the "correctness of procedure", the value T associated with the "total time", and the value V associated with the "time variation". For example, the index value E may be calculated using the following Equation (6). In Equation (6), a1, a2, and a3 are predetermined weighting factors and may be values of 0 or more and 1 or less.

$$E=a1*C+a2*T+a3*V \quad \text{(Equation 6)}$$

It is noted that the above calculation examples of the index value E are merely examples, and the disclosure is not limited thereto. For example, if the index value E is based on parameters used to calculate at least one of the values C, T, and V (e.g., at least one of the number of matches of procedures, the number of procedures, the total of execution time, the total of reference time, the reference time for each procedure, and the execution time for each procedure), it does not necessarily have to be based on the values C, T, and V.

FIG. 15 is a view showing an example of calculation of the index of each operation according to the present embodiment. In addition, in FIG. 15, in the case where the data of the specific time range are the time range TP1 associated with the product 1 of FIG. 14, the index value E of the "transporting" operation in the specific time range is calculated.

In the calculation of the index value E, it may be assumed that (1) the procedures in the specific time range are predetermined, (2) the products or components used in the specific time range are known, and (3) the reference time for each procedure is predetermined. The storage part 12 may pre-store each procedure in the specific time range and the reference time for each procedure.

As shown in FIG. 15, for example, in the time range TP1 (see FIG. 14) associated with the product 1, the procedures are determined to be operated in the order "component 1→component 2→component 3→component 4→component 5→component 6→component 7". Also, the reference time of each procedure in association with each procedure is determined. Herein, in FIG. 15, the procedures actually executed for the product 1 are "component 1→component 2→component 4→component 3→component 5→component 6→component 7". As such, in FIG. 15, the execution order of the component 3 and the component 4 is the reverse of the correct order. Therefore, the value C associated with the "correctness of procedure" is, for example, C=(number of matches of procedures)/number of procedures=5/7≈0.71, in the case where the above Equation (3) is used.

Further, in FIG. 15, the total of the reference time of the components 1 to 7 is 0.4+0.3+0.4+0.5+0.4+0.5+0.3=2.8. The total of the execution time of the components 1 to 7 is 0.3+0.2+0.5+0.3+0.3+0.4+0.3=2.3. Therefore, the value T associated with the "total time" is, for example, T=(total of execution time)/total of reference time=2.8/2.3=1.22, in the case where the above Equation (4) is used.

Further, as for the value V associated with the "time variation", for example, in the case where the above Equation (5) is used, the numerator is the sum of (reference time/execution time) of the seven procedures, i.e., (0.4/0.3)+(0.3/0.2)+ . . . +(0.5/0.4)+(0.3/0.3)≈8.88. On the other hand, the denominator is the number of procedures=7. Therefore, V=8.88/7≈1.27.

Further, in the case where the above Equation (6) is used, for example, assuming that the predetermined coefficients a1, a2, and a3 are set to 1/3, the index value E of the "transporting" operation is E=a1*C+a2*T+a3*V=(1/3*0.71)+(1/3*1.22)+(1/3*1.27)≈1.07. In addition, in FIG. 15, while the index value E of the "transporting" operation has been described, the index value may be similarly calculated for other operations such as "storing", "adjusting", "holding", and "inspecting".

Parallel Operation

The calculation part 14 may calculate an index value for the third evaluation item (e.g., parallel operation) based on the parallel time determined based on the data of the specific time range. Herein, the parallel time is the time when different parts of the operator A (e.g., the right hand and the left hand) have different operation statuses at the same time. For example, in FIG. 14, the specific time range is the time range TP1 associated with the product 1. In FIG. 14, the parallel time may be a time range P1 in which the holding operation is executed with the right hand while the transporting operation is executed with the left hand.

It is noted that the index value may be calculated based on a ratio of the parallel time to the entire specific time range TP1. For example, in FIG. 14, the ratio of the parallel time may be represented by the time of the time range P1/the entire time of the time range TP1.

Hand Rhythm

The calculation part 14 may calculate an index value for the fourth evaluation item (e.g., the hand rhythm) based on the execution time of the repetitive operation determined based on the data of the specific time range. Herein, the repetitive operation may involve a same product, a same component, or a same operation which is performed multiple times. For example, the calculation part 14 may calculate the index value for the hand rhythm of performing a specific operation based on the execution time and the reference time of the specific operation and the number of execution times of the specific operation in the specific time range TP1 in FIG. 14.

Skill Evaluation Operation

Figure 16:
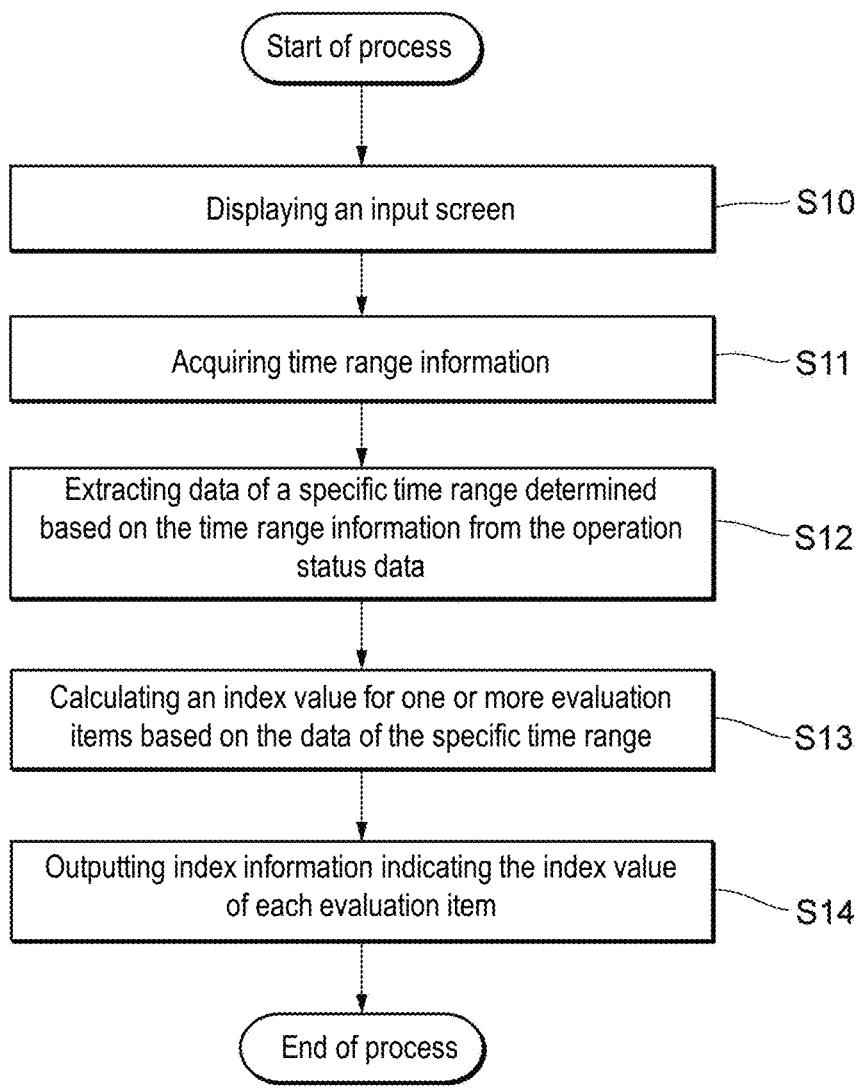
FIG. 16 is a flowchart showing an operator skill evaluation process executed by the skill evaluation system according to the present embodiment.

FIG. 16 is a flowchart showing a skill evaluation process executed by the skill evaluation system 100 according to the present embodiment. First, the skill evaluation system 100 displays an input screen (e.g., FIG. 5 and FIG. 6) on the display part 10f (S10).

The skill evaluation system 100 acquires time range information indicating an arbitrary time range selected or inputted through an operation of the input part 10e by a user (S11). Further, in step S11, the skill evaluation system 100 may acquire evaluation unit information indicating an evaluation unit selected or inputted through an operation of the input part 10e by the user.

From the operation status data 12a, the skill evaluation system 100 extracts data of a specific time range determined based on the time range information acquired in step S11 (S12). Further, in step S12, based on the evaluation unit indicated by the evaluation unit information acquired in step S11, the skill evaluation system 100 may determine the specific time range which at least partially overlaps with the time range indicated by the time range information, and extract the data of the specific time range from the operation status data 12a.

The skill evaluation system 100 may calculate an index value for one or more evaluation items based on the data of the specific time range extracted in step S12 (S13). The skill evaluation system 100 may output index information indicating the index value (e.g., (b) of FIG. 8 to (b) of FIG. 13) on the display part 10f (S14). Based on the above, the skill evaluation process is completed.

Based on the above, while the skill evaluation process of the operator A in the manufacturing line has been described in the present embodiment, the present embodiment may be appropriately applied to evaluation of skills of humans performing sports, arts, daily activities, and the like.

The embodiment of the disclosure may be described as the following appendices. However, the embodiment of the disclosure is not limited to the forms described in the following appendices. Further, the embodiment of the disclosure may have a form in which the descriptions between the appendices are replaced or combined.

APPENDIX 1

A skill evaluation device (10) including:
an acquisition part (11) acquiring time range information indicating an arbitrary time range;
an extraction part (13) extracting data of a specific time range determined based on the time range information from operation status data indicating an operation status of an operator in a time series;
a calculation part (14) calculating an index value of a skill of the operator for one or more evaluation items based on the data of the specific time range; and
an output part (15) outputting index information indicating the index value.

APPENDIX 2

The skill evaluation device (10) according to Appendix 1, in which
the acquisition part (11) acquires evaluation unit information indicating an evaluation unit of the skill, and
the extraction part (13) determines the data of the specific time range which at least partially overlaps with the arbitrary time range indicated by the time range information based on the evaluation unit information.

APPENDIX 3

The skill evaluation device (10) according to Appendix 2, in which the extraction part (13) determines, as the data of the specific time range, data within the arbitrary time range indicated by the time range information excluding data unassociated with the evaluation unit.

APPENDIX 4

The skill evaluation device (10) according to Appendix 2 or Appendix 3, in which the extraction part (13) determines, as the data of the specific time range, data associated with the evaluation unit within a predetermined period adjacent to the arbitrary time range indicated by the time range information.

APPENDIX 5

The skill evaluation device (10) according to any one of Appendix 2 to Appendix 4, in which the extraction part (13) determines, as the data of the specific time range, data associated with the evaluation unit within the arbitrary time range indicated by the time range information.

APPENDIX 6

The skill evaluation device (10) according to any one of Appendix 1 to Appendix 5, further including a display part (10f) displaying the operation status data, in which
the acquisition part (11) acquires the time range information inputted from an input part based on the operation status data displayed on the display part.

APPENDIX 7

The skill evaluation device (10) according to Appendix 6, in which the display part (10f) displays the operation status data for each of a right hand and a left hand of the operator.

APPENDIX 8

A skill evaluation method including:
acquiring time range information indicating an arbitrary time range;
extracting data of a specific time range determined based on the time range information from operation status data indicating an operation status of an operator in a time series;
calculating an index value of a skill of the operator for one or more evaluation items based on the data of the specific time range; and
outputting index information indicating the index value.

APPENDIX 9

A non-transitory computer readable storage medium, storing a skill evaluation program, causing a computation part provided in a skill evaluation device to function as:
acquisition part acquiring time range information indicating an arbitrary time range;
an extraction part extracting data of a specific time range determined based on the time range information from operation status data indicating an operation status of an operator in a time series;
a calculation part calculating an index value of a skill of the operator for one or more evaluation items based on the data of the specific time range; and
an output part outputting index information indicating the index value.

What is claimed is:

1. A skill evaluation device comprising:
a display device;
an image capturing device, capturing a moving image recording a series of motions in time for producing a product or a component; and
a processor, coupled to the display device and configured to:
display, on the display device, a graphical interface including a first input field for inputting an arbitrary time range, a second input field for inputting a first evaluation unit among a plurality of evaluation units as an evaluation unit information;
acquire the arbitrary time range and the first evaluation unit input through the graphical interface, wherein the evaluation units further include a second evaluation unit different from the first evaluation unit;
generating operation status data by executing motion analysis process that analyzes the moving image to obtain coordinate values in the moving image that indicates operations of an operator, wherein, in the motion analysis process, the series of motions captured by the image capturing device are classified into a plurality of operation statuses with a plurality of time stamps associated to the plurality of motions by using the coordinate values obtained from the moving image, wherein the plurality of operation statuses include a first operation status associated with the first evaluation unit and a second operation status associated with the second evaluation unit, and wherein the first operation status is determined to have a first time range based on the coordinate value associated with the first operation status in the moving image, and the second operation status is determined to have a second time range based on coordinate value associated with the second operation status in the moving image;
determine a specific time range which is different from and partially overlapping with the arbitrary time range based on the time range information and the evaluation unit information by extracting the first time range associated with the first evaluation unit and excluding the second time range associated with the second evaluation unit from the arbitrary time range based on the time stamps corresponding to the first and second operation statuses, wherein the specific time range is only associated with the first evaluation unit corresponding to the time stamp of the first operation status in the moving image, and the arbitrary time range is associated with the first evaluation unit and the second evaluation unit and includes the time stamp corresponding to the first operation status and the time stamp corresponding to the second operation status;
extract data within the specific time range from the operation status data, wherein the data within the specific time range includes the first operation status associated with the first evaluation unit and a third operation status different from the first operation status and the second operation status, wherein the first and third operation statuses are only associated to the first evaluation unit;
calculate an index value of skill of the operator for one or more evaluation items based on the data within the specific time range;
output index information indicating the index value; and
display a chart illustrating each of the one or more evaluation items and the corresponding index value based on the index information.

2. The skill evaluation device according to claim 1, wherein the third operation statues corresponds to a third time range that is associated with the evaluation unit within a predetermined period adjacent to the arbitrary time range.

3. The skill evaluation device according to claim 1, wherein the graphical interface further includes a section displaying the operation status data corresponding to an entire time range of the moving image.

4. The skill evaluation device according to claim 3, wherein the graphical interface further displays the operation status data for each of a right hand and a left hand of the operator.

5. A skill evaluation method comprising:
capturing a moving image recording a series of motions in time for producing a product or a component;
displaying, on a display device, a graphical interface including a first input field for inputting an arbitrary time range, a second input field for inputting a first evaluation unit among a plurality of evaluation units as an evaluation unit information;
acquiring the arbitrary time range and the first evaluation unit input though the graphical interface, wherein the evaluation units further include a second evaluation unit different from the first evaluation unit;
generating operation status data by executing motion analysis process that analyzes the moving image to obtain coordinate values in the moving image that indicates operations of an operator, wherein, in the motion analysis process, the series of motions captured by the image capturing device are classified into a plurality of operation statuses with a plurality of time stamps associated to the plurality of motions by using the coordinate values obtained from the moving image, wherein the plurality of operation statuses include a first operation status associated with the first evaluation unit and a second operation status associated with the second evaluation unit, and wherein the first operation status is determined to have a first time range based on the coordinate value associated with the first operation status in the moving image, and the second operation status is determined to have a second time range based on coordinate value associated with the second operation status in the moving image;
determining a specific time range which is different from and partially overlapping with the arbitrary time range based on the time range information and the evaluation unit information by extracting the first time range associated with the first evaluation unit and excluding the second time range associated with the second evaluation unit from the arbitrary time range based on the time stamps corresponding to the first and second operation statuses, wherein the specific time range is only associated with the first evaluation unit corresponding to the time stamp of the first operation status in the moving image, and the arbitrary time range is associated with the first evaluation unit and the second evaluation unit and includes the time stamp corresponding to the first operation status and the time stamp corresponding to the second operation status;
extracting data within the specific time range from the operation status data, wherein data within the specific time range includes the first operation status associated with the first evaluation unit and a third operation status different from the first operation status and the second operation status, wherein the first and third operation statuses are only associated to the first evaluation unit;

calculating an index value of a skill of the operator for one or more evaluation items based on the data of the specific time range;

outputting index information indicating the index value; and displaying a chart illustrating each within the one or more evaluation items and the corresponding index value based on the index information.

6. A non-transitory computer readable storage medium, storing a skill evaluation program, causing a computer provided in a skill evaluation device, comprising:

acquiring a moving image captured by an image capturing device, the moving image recording a series of motions in time for producing a product or a component;

displaying, on a display device, a graphical interface including a first input field for inputting an arbitrary time range, a second input field for inputting a first evaluation unit among a plurality of evaluation units as an evaluation unit information;

acquiring the arbitrary time range the first evaluation unit input through the graphical interface, wherein the evaluation units further include a second evaluation unit different from the first evaluation unit;

generating operation status data by executing motion analysis process that analyzes the moving image to obtain coordinate values in the moving image that indicates operations of an operator, wherein, in the motion analysis process, the series of motions captured by the image capturing device are classified into a plurality of operation statuses with a plurality of time stamps associated to the plurality of motions by using the coordinate values obtained from the moving image, wherein the plurality of operation statuses include a first operation status associated with the first evaluation unit and a second operation status associated with the second evaluation unit, and wherein the first operation status is determined to have a first time range based on the coordinate value associated with the first operation status in the moving image, and the second operation status is determined to have a second time range based on coordinate value associated with the second operation status in the moving image;

determining a specific time range which is different from and partially overlapping with the arbitrary time range based on the time range information and the evaluation unit information by extracting the first time range associated with the first evaluation unit and excluding the second time range associated with the second evaluation unit from the arbitrary time range based on the time stamps corresponding to the first and second operation statuses, wherein the specific time range is only associated with the first evaluation unit corresponding to the time stamp of the first operation status in the moving image, and the arbitrary time range is associated with the first evaluation unit and the second evaluation unit and includes the time stamp corresponding to the first operation status and the time stamp corresponding to the second operation status;

extracting data within the specific time range from operation status data, wherein data within the specific time range includes the first operation status associated with the first evaluation unit and a third operation status different from the first operation status and the second status, wherein the first and third operation statuses are only associated to the first evaluation unit;

calculating an index value of a skill of the operator for one or more evaluation items based on the data of the specific time range;

outputting index information indicating the index value; and displaying a chart illustrating each within the one or more evaluation items and the corresponding index value based on the index information.

7. The skill evaluation device according to claim 1, further comprising a motion sensor, measuring the operation statuses for producing the product or the component.

8. The skill evaluation device according to claim 1, wherein the first input field includes a selection of the arbitrary time range from at least one of morning hours, afternoon hours, entire day, week, month and a time range inputted by a user, and the second input field includes a selection of the evaluation unit from at least one of product, component, and operation.

* * * * *